(12) United States Patent
Hildebrand

(10) Patent No.: US 7,627,527 B1
(45) Date of Patent: Dec. 1, 2009

(54) SYSTEM AND METHOD TO PROVIDE A PAYMENT

(75) Inventor: Marc Hildebrand, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 11/926,518

(22) Filed: Oct. 29, 2007

(51) Int. Cl.
  *G06Q 40/00* (2006.01)
(52) U.S. Cl. .......................................... 705/39; 705/40
(58) Field of Classification Search .................. 705/39, 705/40; 715/808, 975
  See application file for complete search history.

(56) References Cited

U.S. PATENT DOCUMENTS

| | | | | |
|---|---|---|---|---|
| 5,963,925 | A | * | 10/1999 | Kolling et al. ................. 705/40 |
| 5,978,780 | A | * | 11/1999 | Watson ........................ 705/40 |
| 6,385,595 | B1 | | 5/2002 | Kolling et al. |
| 6,385,995 | B1 | * | 5/2002 | Komatsubara et al. ........ 62/505 |
| 6,408,284 | B1 | | 6/2002 | Hilt et al. |
| 7,251,656 | B2 | * | 7/2007 | Keown et al. ................. 707/10 |
| 2001/0045451 | A1 | * | 11/2001 | Tan et al. ..................... 235/375 |
| 2003/0105710 | A1 | | 6/2003 | Barbara et al. |
| 2005/0080685 | A1 | * | 4/2005 | Blum .......................... 705/26 |

\* cited by examiner

*Primary Examiner*—Daniel S Felten
*Assistant Examiner*—William E Rankins

(57) ABSTRACT

Various embodiments of the present disclosure are directed to systems and methods to provide a payment. The systems and methods provide techniques to provide customers one-click access to a plurality of websites and to enable customers to provide payments electronically. The provider may store access information for the plurality of websites and provide the access information to the websites at the request of the customer. Additionally, the provider may enable the customers to provide payments from a plurality of different financial accounts electronically.

21 Claims, 18 Drawing Sheets

SYSTEM AND METHOD TO PROVIDE A PAYMENT

CROSS REFERENCE TO RELATED APPLICATIONS

The present application is related to (1) U.S. Utility application Ser. No. 11/926,393, filed on Oct. 29, 2007, and (2) U.S. Utility application Ser. No. 11/926,500, filed on Oct. 29, 2007, the disclosures which are incorporated herein by reference.

FIELD OF THE DISCLOSURE

Various embodiments of the disclosure pertain to a system and method to provide a payment.

BACKGROUND

Customers often use financial accounts to provide a payment. Such financial accounts may include checking accounts, debit card accounts, and credit card accounts.

Some customers may prefer to provide payments electronically, (e.g., using the Internet). Conventionally, when providing a payment electronically, the type of financial accounts available for the customers to use to provide the payment may be limited. Because of this, the customers who desire to provide payments from a variety of different accounts may have to access a variety of different Internet websites in order to do so. This can be inefficient and frustrating to customers. Additionally, this can result in a fragmented payment history that requires customers to access a variety of different Internet websites in order to ascertain their current bill-paying status.

Accordingly, it is desirable to provide an improved system and method to provide a payment.

SUMMARY

Various embodiments of the present disclosure are directed to systems and methods to provide a payment. The systems and methods provide techniques to provide customers one-click access to a plurality of websites and to enable customers to provide payments electronically. The provider may store access information for the plurality of websites and provide the access information to the websites at the request of the customer. Additionally, the provider may enable the customers to provide payments from a plurality of different financial accounts electronically.

BRIEF DESCRIPTION OF THE DRAWINGS

FIG. 1b is a schematic view illustrating an embodiment of an information handling system used with the system to provide a payment of FIG. 1a.

FIG. 1c is a schematic view illustrating an embodiment of a provider used in the system to provide a payment of FIG. 1a.

FIG. 2b is a screenshot illustrating an embodiment of a Payee Account Setup webpage used in the method of FIG. 2a.

FIG. 2c is a screenshot illustrating an embodiment of an Accounts And Bills webpage used in the method of FIG. 2a.

FIG. 2d is a screenshot illustrating an embodiment of an option window used in the method of FIG. 2a.

FIG. 3b is a screenshot illustrating an embodiment of a Payment webpage embedded in a Payment Assistance webpage used in the method of FIG. 3a.

FIG. 3c is a screenshot illustrating an embodiment of a Payment Confirmation webpage embedded in a Payment Assistance webpage used in the method of FIG. 3a.

FIG. 3d is a screenshot illustrating an embodiment of a Payment Confirmation webpage used in the method of FIG. 3a.

FIG. 3e is a screenshot illustrating an embodiment of a Payment History webpage used in the method of FIG. 3a.

FIG. 4b is a screenshot illustrating an embodiment of a Login webpage used in the method of FIG. 4a.

FIG. 4c is a screenshot illustrating an embodiment of a Hub webpage used in the method of FIG. 4a.

FIG. 4d is a screenshot illustrating an embodiment of a Website Setup webpage used in the method of FIG. 4a.

FIG. 4e is a screenshot illustrating an alternative embodiment of a Hub webpage used in the method of FIG. 4a.

FIG. 4f is a screenshot illustrating an alternative embodiment of a Hub webpage used in the method of FIG. 4a.

DETAILED DESCRIPTION

Figure 1A:
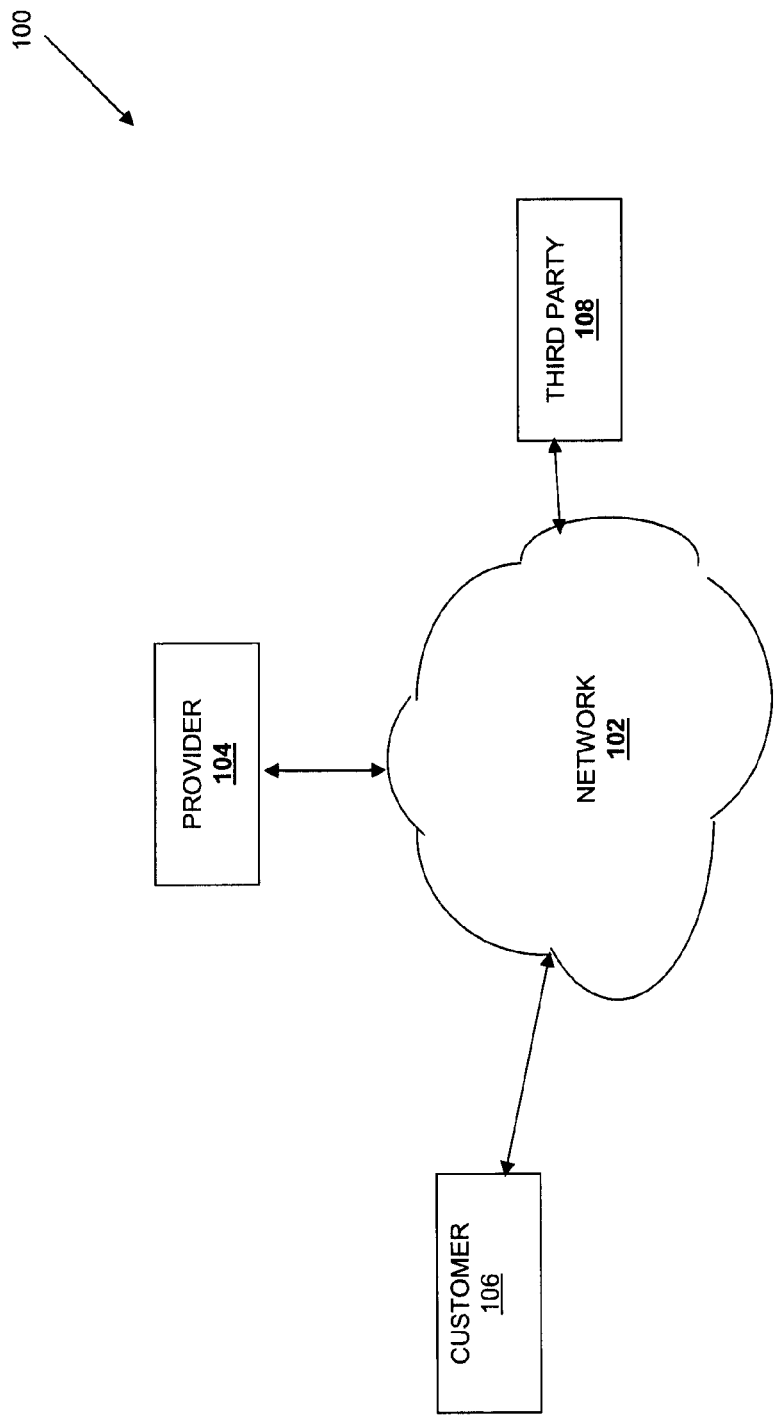
FIG. 1a is a schematic view illustrating an embodiment of a system to provide a payment.

Referring now to FIG. 1a, in one embodiment, a system 100 to provide a payment is illustrated. The system 100 includes a network 102 such as, for example, a Transport Control Protocol/Internet Protocol (TCP/IP) network (e.g., the Internet or an intranet). A provider 104, a customer 106 of the provider 104, and a third party 108 are operably coupled to the network 102 in order to allow communication between the provider 104, the customer 106, and the third party 108. For clarity, FIG. 1a depicts only one provider 104, one customer 106, and one third party 108. However, the system 100 may include a plurality of providers, a plurality of customers, and a plurality of third parties.

Each of the provider 104, the customer 106, and the third party 108 includes a respective network interface for communicating with the network 102 (e.g., outputting information to, and receiving information from, the network 102), such as by transferring information (e.g., instructions, data, signals) between the provider 104, the customer 106, and the third party 108. Accordingly, through the network 102, the provider 104 communicates with the customer 106 and the third party 108; the customer 106 communicates with the provider 104 and the third party 108; and the third party 108 communicates with the customer 106 and the provider 104.

Each of the provider 104, the customer 106, and the third party 108 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, all such IHSs are coupled to each other through the network 102. Accordingly, the provider 104, the customer 106, and the third party 108 operate within the network 102.

An IHS is an electronic device capable of processing, executing or otherwise handling information. Examples of an IHS include a server computer, a personal computer (PC) (e.g., a desktop computer or a portable computer such as, for example, a laptop computer), or a handheld computer.

Examples of an IHS also include a router, a switch and other devices coupled to a network (e.g., the network 102).

Figure 1B:
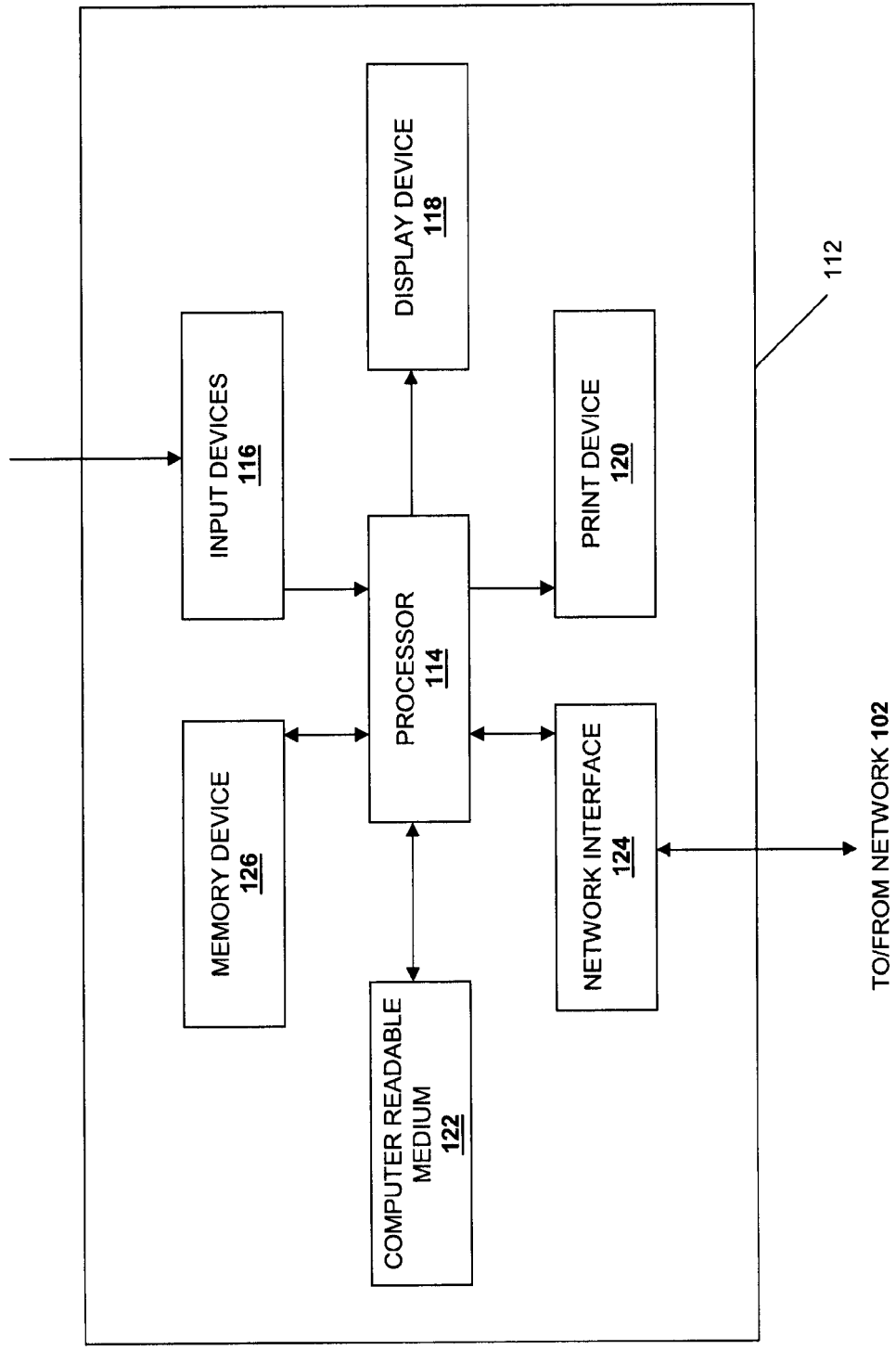

Referring now to FIG. 1b, an IHS 112 that is representative of one of the IHSs described above, is illustrated. The IHS 112 may include any or all of the following: (a) a processor 114 for executing and otherwise processing instructions, (b) a plurality of input devices 116, which are operably coupled to the processor 114, for inputting information, (c) a display device 118 (e.g., a conventional electronic cathode ray tube (CRT) device or a conventional liquid crystal display (LCD)), which is operably coupled to the processor 114, for displaying information, (d) a print device 120 (e.g. a conventional electronic printer or plotter), which is operably coupled to the processor 114, for printing visual images (e.g., textual or graphic information on paper), scanning visual images, and/or faxing visual images, (e) a computer-readable medium 122, which is operably coupled to the processor 114, for storing information, as discussed further below; (f) a network interface 124 (e.g., circuitry) for communicating between the processor 114 and the network 102; (g) a memory device 126 (e.g., a random access memory (RAM) device or a read-only memory (ROM) device) for storing information (e.g., instructions executed by the processor 114 and data operated upon by the processor 114 in response to such instructions); and (h) various other electronic circuitry for performing other operations of the IHS 112 known in the art. Accordingly, the processor 114 is operably coupled to the plurality of input devices 116, the display device 118, the print device 120, the computer-readable medium 122, the network interface 124, and the memory device 126, as illustrated in FIG. 1b.

For example, in response to signals from the processor 114, the display device 118 displays visual images. Information may be input to the processor 114 from the input devices 116, and the processor 114 may receive such information from the input devices 116. Also, in response to signals from the processor 114, the print device 120 may print visual images on paper, scan visual images, and/or fax visual images.

The input devices 116 include a variety of input devices known in the art such as, for example, a conventional electronic keyboard and a pointing device such as, for example, a conventional electronic mouse, trackball, or light pen. The keyboard may be operated to input alphanumeric text information to the processor 114, and the processor 114 may receive such alphanumeric text information from the keyboard. The pointing device may be operated to input cursor-control information to the processor 114, and the processor 114 may receive such cursor-control information from the pointing device.

The computer-readable medium 122 and the processor 114 are structurally and functionally interrelated with one another as described below in further detail. Each IHS of the illustrative embodiment is structurally and functionally interrelated with a respective computer-readable medium, similar to the manner in which the processor 114 is structurally and functionally interrelated with the computer-readable medium 122. In that regard, the computer-readable medium 122 is a representative one of such computer-readable media including, for example, but not limited to, a hard disk drive.

The computer-readable medium 122 stores (e.g., encodes, records, or embodies) functional descriptive material (e.g., including but not limited to software (also referred to as computer programs or applications) or data structures). Such functional descriptive material imparts functionality when encoded on the computer-readable medium 122. Also, such functional descriptive material is structurally and functionally interrelated to the computer-readable medium 122.

With such functional descriptive material, data structures define structural and functional interrelationships between such data structures and the computer-readable medium 122 (and other aspects of the system 100). Such interrelationships permit the data structures' functionality to be realized. Also, within such functional descriptive material, computer programs define structural and functional interrelationships between such computer programs and the computer-readable medium 122 (and other aspects of the system 100). Such interrelationships permit the computer programs' functionality to be realized.

For example, the processor 114 reads (e.g., accesses or copies) such functional descriptive material from the computer-readable medium 122 onto the memory device 126 of the IHS 112, and the IHS 112 (more particularly, the processor 114) performs its operations, as described elsewhere herein, in response to such material which is stored in the memory device 126 of the IHS 112. More particularly, the processor 114 performs the operation of processing a computer application (that is stored, encoded, recorded, or embodied on a computer-readable medium such as computer-readable medium 122) for causing the processor 114 to perform additional operations, as described elsewhere herein. Accordingly, such functional descriptive material exhibits a functional interrelationship with the way in which processor 114 executes its processes and performs its operations.

Further, the computer-readable medium 122 is an apparatus from which the computer application is accessible by the processor 114, and the computer application is processable by the processor 114 for causing the processor 114 to perform such additional operations. In addition to reading such functional descriptive material from the computer-readable medium 122, the processor 114 is capable of reading such functional descriptive material from (or through) the network 102, which is also a computer-readable medium (or apparatus). Moreover, the memory device 126 of the IHS 112 is itself a computer-readable medium (or apparatus).

In an embodiment, the provider 104 may include a membership organization, and the customer 106 may be a member of the membership organization. The provider 104 and/or the third party 108 may provide a plurality of services to the customer 106 such as, for example, banking services, insurance services, financial services, loans, and/or a variety of other services known in the art. In an embodiment, the provider 104 and/or the third party 108 may be a creditor of the customer 106, a lender of the customer 106, and/or a counseling agency of the customer 106. In an embodiment, the provider 104 and/or the third party 108 may provide a website to the customer 106 and/or receive payments from the customer 106. In an embodiment, the provider 104 and/or the third party 108 may provide an account to the customer 106. The account may include, for example, a banking account, a credit card account, and/or a variety of other accounts known in the art. The banking account may include an account other than a credit card account such as, for example, a debit card account, a demand deposit account, a money market account, an asset management account, a checking account, a savings account, and/or a variety of other accounts known in the art.

Figure 1C:
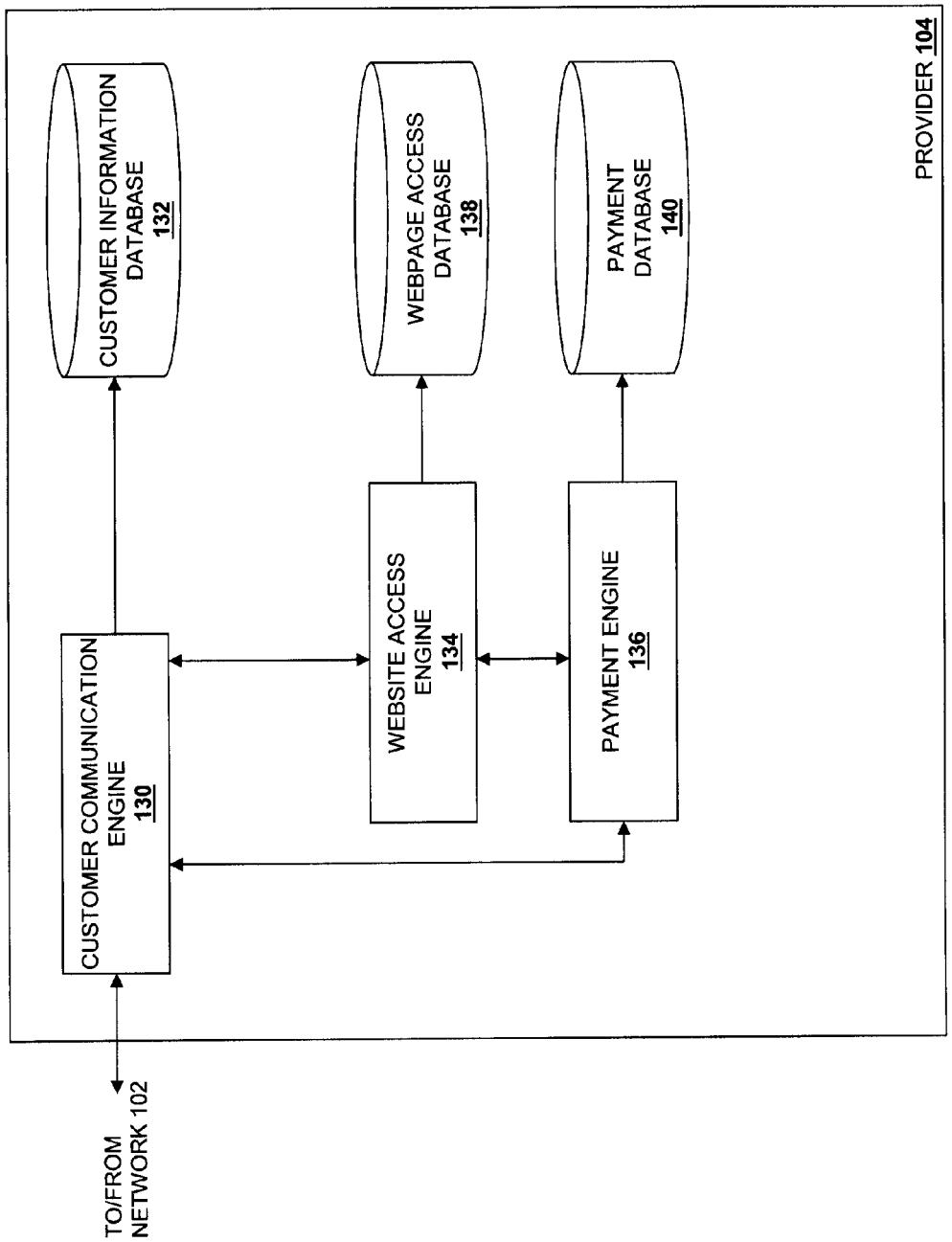

Referring now to FIGS. 1a, 1b and 1c, the provider 104 is illustrated in more detail. A customer communication engine 130 which may be, for example, software stored on the computer-readable medium 122 in the IHS 112, is included in the provider 104 and is operably coupled to a customer information database 132, a website access engine 134, a payment engine 136, and the network 102. The website access engine 134 which may be, for example, software stored on the computer-readable medium 122 in the IHS 112, is operably coupled to the customer communication engine 130, a website access database 138, and the payment engine 136. The payment engine 136 which may be, for example, software stored on the computer-readable medium 122 in the IHS 112, is operably coupled to the customer communication engine 130, the website access engine 134, and a payment database 140. In an embodiment, the customer information database 132, the website access database 138, and the payment database 140 are conventional databases known in the art. In an embodiment, the customer information database 132, the website access database 138, and the payment database 140 may be located outside the provider 104 and be operably coupled to the provider 104 and the engines 130, 134 and 136 through, for example, the network 102. In an embodiment, the customer information database 132, the website access database 138, and the payment database 140 each include a plurality of databases. In an embodiment, the customer information database 132, the website access database 138, and the payment database 140 are publicly available databases. In an embodiment, the customer information database 132, the website access database 138, and the payment database 140 are private databases that are accessible only by the provider 104.

The customer information database 132 may include a variety of previously collected information about the customer 106. The customer information database 132 may include account information about an account of the customer 106 such as, for example, an account number, a current balance, a future balance, an account type, a name of the customer 106, and/or a variety of other account information known in the art. The future balance may include what the balance of the account will be after scheduled payments from the account are made. Account information about a banking account may be referred to as banking account information. Likewise, account information about a credit card account may be referred to as credit card account information. The website access database 138 may include access information. The access information may include information needed to allow the customer 106 to access a website such as, for example, a password of the customer 106, a login identification of the customer 106, a personal identification number (PIN) of the customer, an account number of the customer 106, a universal resource locator (URL) for a Login webpage of the website, and/or a variety of other access information known in the art. In an embodiment, a website includes a plurality of webpages. The payment database 140 may include payment information about past and future payments from the customer 106 to a payee such as, for example, a name of the payee, an amount of the payment, a date of the payment, a payee account balance before the payment, a minimum amount due, a due date, an account from which to transfer the payment, and/or a variety of other payment information known in the art.

The payment engine 136 may be used to access the payment information in the payment database 140 and provide the payment information to the customer communication engine 130. The website access engine 134 may be used to access the access information in the website access database 138, access a payee website, and provide the payee website to the customer communication engine 130. In an embodiment, the payee website may be password-protected, and the website access engine 134 may use a login and/or password to access the payee website. The customer communication engine 130 may be used to access the account information in the customer information database 132, retrieve the payee website from the website access engine 134, retrieve the payment information from the payment engine 136, and provide a website to the customer 106 over the network 102. The payee website may be a website that is provided by a payee of the customer 106, and may be used by the customer 106 and/or the provider 104 to provide a payment from the customer 106 to the payee. In an embodiment, the payee website may be password-protected, and the website access engine 134 may use a login and/or password to access secure portions of the payee website. The payee of the customer 106 may be an entity that the customer 106 desires to make a payment to such as, for example, the third party 108, the provider 104, a friend or family member of the provider 104, and/or a variety of other kinds of payees known in the art. The account information, described above, and/or the website access information, described above, may also include payee account information. In an embodiment, the payee account information may be used by the provider 104 to access the payee website, contact the payee, and/or provide the payment to the payee. The payee account information may include, for example, the access information for the payee website, the account information for an account provided by the payee to the customer 106, contact information of the payee, and/or a variety of other payee account information known in the art.

The provider 104 may store account information associated with an account in the customer information database 132. The account information, described above, may include, for example, debit card account information about a debit card account, demand deposit account information about a demand deposit account, money market account information about a money market account, asset management account information about an asset management account, checking account information about a checking account, savings account information about a savings account, and/or credit card account information about a credit card account.

Referring now to FIGS. 1a, 1b, 1c and 2a, a method 200 to provide a payment is illustrated. One of skill in the art will recognize that, within the scope of this disclosure, additional steps may be provided before, during, and after the method 200, and some of the steps described below may be replaced or eliminated in some embodiments of the method 200.

The method 200 begins at block 202 where a banking account is provided to the customer 106. In an embodiment, the banking account may be provided by the provider 104 and/or the third party 108. In an embodiment, banking account information, such as described above, about the banking account may be stored in the customer information database 132. In an embodiment, the customer 106 may submit an application for the banking account before the banking account is provided, and information provided on the application may be stored in the customer information database 132.

The method 200 then proceeds to block 204 where a credit card account is provided to the customer 106. In an embodiment, the provider 104 and/or the third party 108 may provide the credit card account. In an embodiment, credit card account information, such as described above, about the credit card account may be stored in the customer information database 132. In an embodiment, the customer 106 may submit an application for the credit card account before the credit card account is provided, and information provided on the application may be stored in the customer information database 132.

In an embodiment, a credit inquiry may be performed on the customer 106 before providing the credit card account. The credit inquiry may be performed, for example, by the provider 104, a credit reporting agency, the third party 108, a creditor of the customer 106, a counseling agency, a lender, and/or a variety of other entities known in the art. Performing the credit inquiry may include the review of a credit report and/or a credit history of the customer 106. The credit inquiry may include a soft credit inquiry and/or a hard credit inquiry. The soft credit inquiry may be an inquiry that has no adverse consequences for the customer 106. The hard credit inquiry may be an inquiry that may have adverse consequences for the customer 106. Adverse consequences may include, for example, the credit history of the customer 106 being affected by performing the credit inquiry.

The credit inquiry may further include, for example, inquiries of payment records of the customer 106, a responsibility assessment of the customer 106, a stability assessment of the customer 106, and/or a variety of other inquiries known in the art. The payment records of the customer 106 may include, for example, information about a plurality of payments by the customer 106 to a plurality of providers. The responsibility assessment of the customer 106 may include whether the customer 106 is living beyond their financial means such as, for example, whether credit payments due from the customer 106 each month exceed 15 percent of an after-tax income of the customer 106. The stability assessment of the customer 106 may include, for example, whether the customer 106 has retained a job and/or a residence for more than two years. In an embodiment, the provider 104 may use a result from the credit inquiry to determine a credit limit for the credit card account.

The method 200 then proceeds to block 206 where the provider 104 enrolls the customer 106 in an electronic bill-paying program. In an embodiment, the electronic bill-paying program may be used by the customer 106 to provide payments to a payee of the customer 106. The electronic bill-paying program may be used by the customer 106 to, for example, pay bills online, send money to friends or family, set up one-time payments, and/or set up recurring payments. In an embodiment, the provider 104 and/or the third party 108 may provide the electronic bill-paying program. In an embodiment, the provider 104 may receive electronic bill-paying information from the customer 106, the third party 108, the website access database 138, the payment database 140, and/or the payee. The electronic bill-paying information may include a variety of information relating to the payment of bills of the customer 106 such as, for example, payee account information, described above. In an embodiment, the provider 104 may store the electronic bill-paying information in the website access database 138 and/or the payment database 140.

The method 200 then proceeds to block 208 where the provider 104 obtains the banking account information about the banking account of the customer 106. In an embodiment, the provider 104 may obtain the banking account information from the customer 106, the third party 108, the payee, and/or the customer information database 132.

The method 200 then proceeds to block 210 where the provider 104 obtains the credit card account information about the credit card account of the customer 106. In an embodiment, the provider 104 may obtain the credit card account information from the customer 106, the third party 108, the payee, and/or the customer information database 132.

Referring now to FIGS. 1*a*, 1*b*, 1*c*, 2*a*, 2*b* and 2*c*, the method 200 then proceeds to block 212 where the provider 104 obtains payee account information, described above. In an embodiment, the provider 104 may obtain the payee account information from the customer 106, the third party 108, the payee, the customer information database 132, the website access database 138, and/or the payment database 140.

Figure 2A:
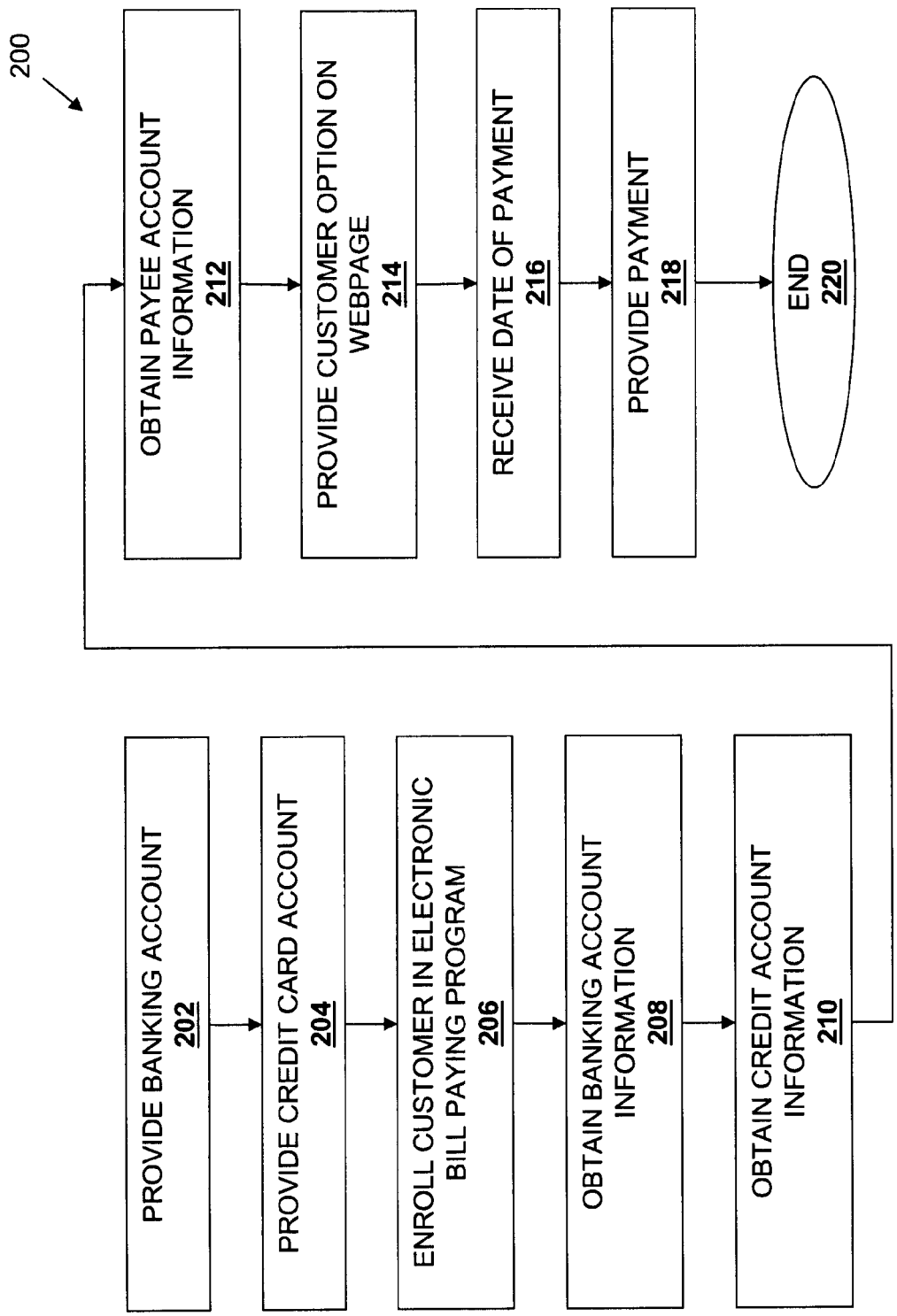
FIG. 2a is a flow chart illustrating an embodiment of a method to provide a payment.
Figure 2B:
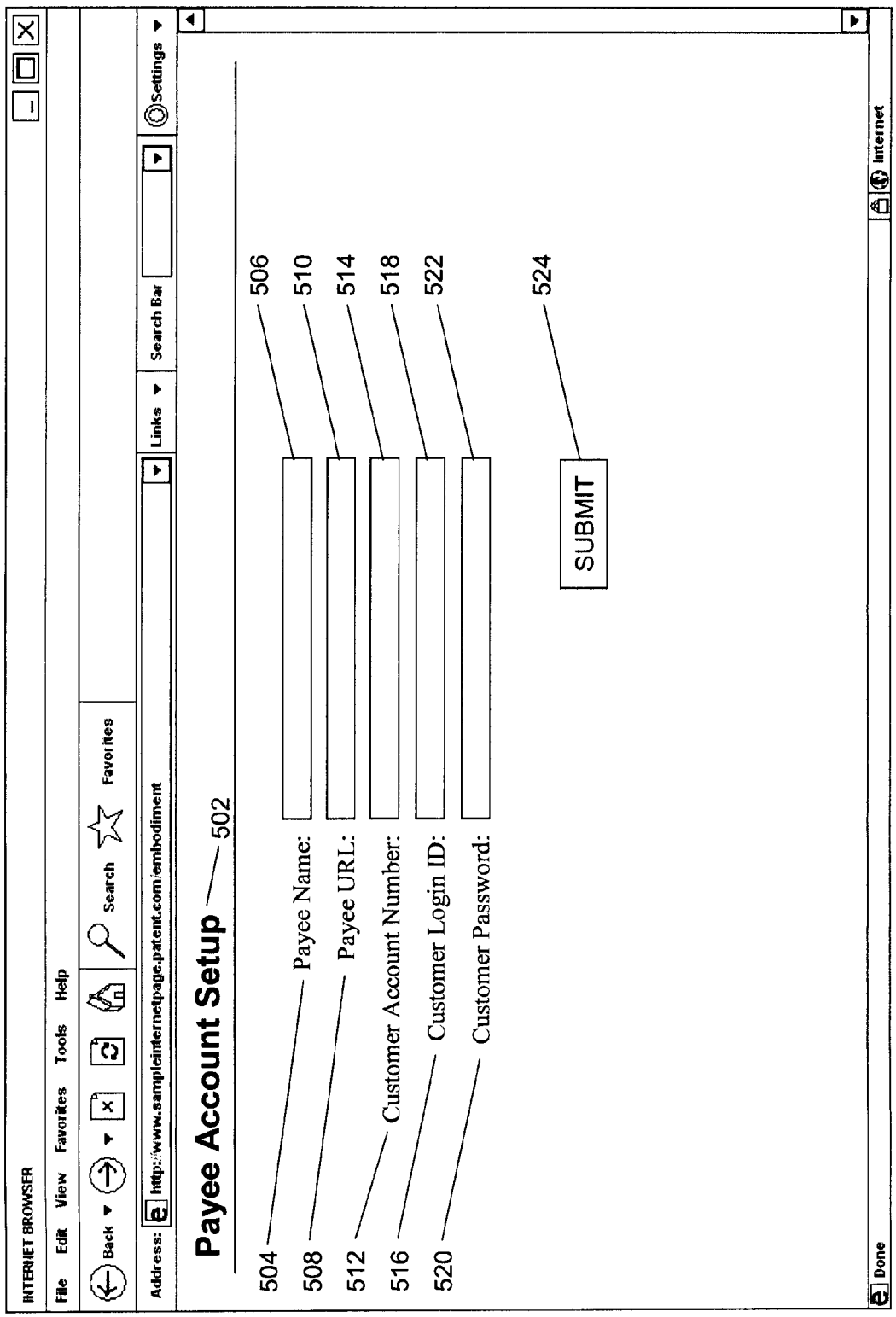

In an embodiment, the provider 104 may obtain the payee account information from the customer 106 by providing a Payee Account Setup webpage 500, illustrated in FIG. 2*b*, to the customer 106. The Payee Account Setup webpage 500 includes a Payee Account Setup header 502, a Payee Name prompt 504, a corresponding payee name field 506, a Payee URL prompt 508, a corresponding payee URL field 510, a Customer Account Number prompt 512, a corresponding customer account number field 514, a Customer Login ID prompt 516, a corresponding customer login ID field 518, a Customer Password prompt 520, a corresponding customer password field 522, and a Submit button 524. In an embodiment, the customer 106 may enter the name of the payee in the payee name field 506, a URL of a webpage of the payee website in the payee URL field 510, an account number of the account of the customer 106 in the customer account number field 514, a login ID of the customer 106 in the customer login ID field 518, a password of the customer 106 in the customer password field 522, and select the Submit button 524 to send the payee account information to the provider 104.

Figure 2C:
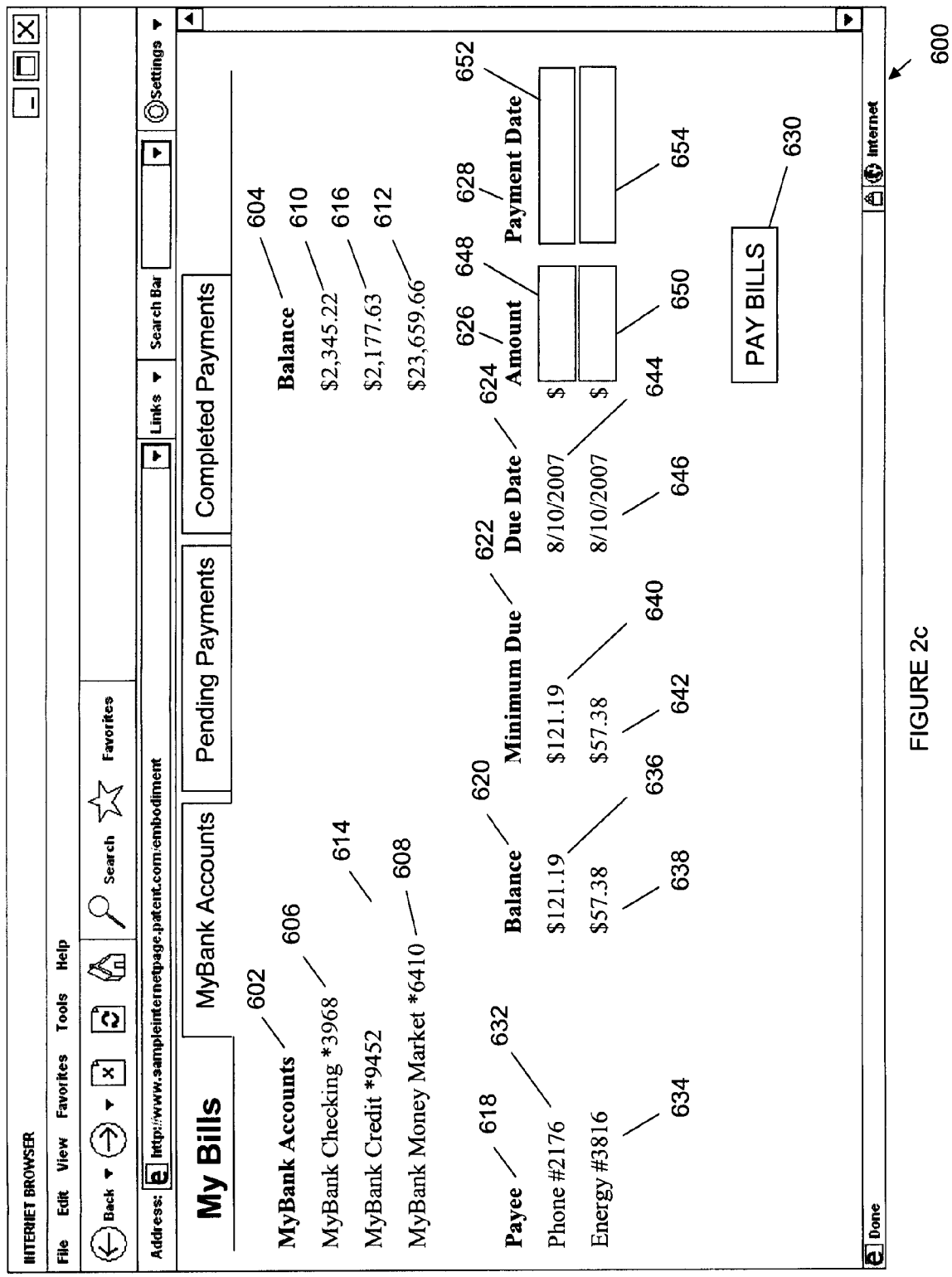
Figure 2D:
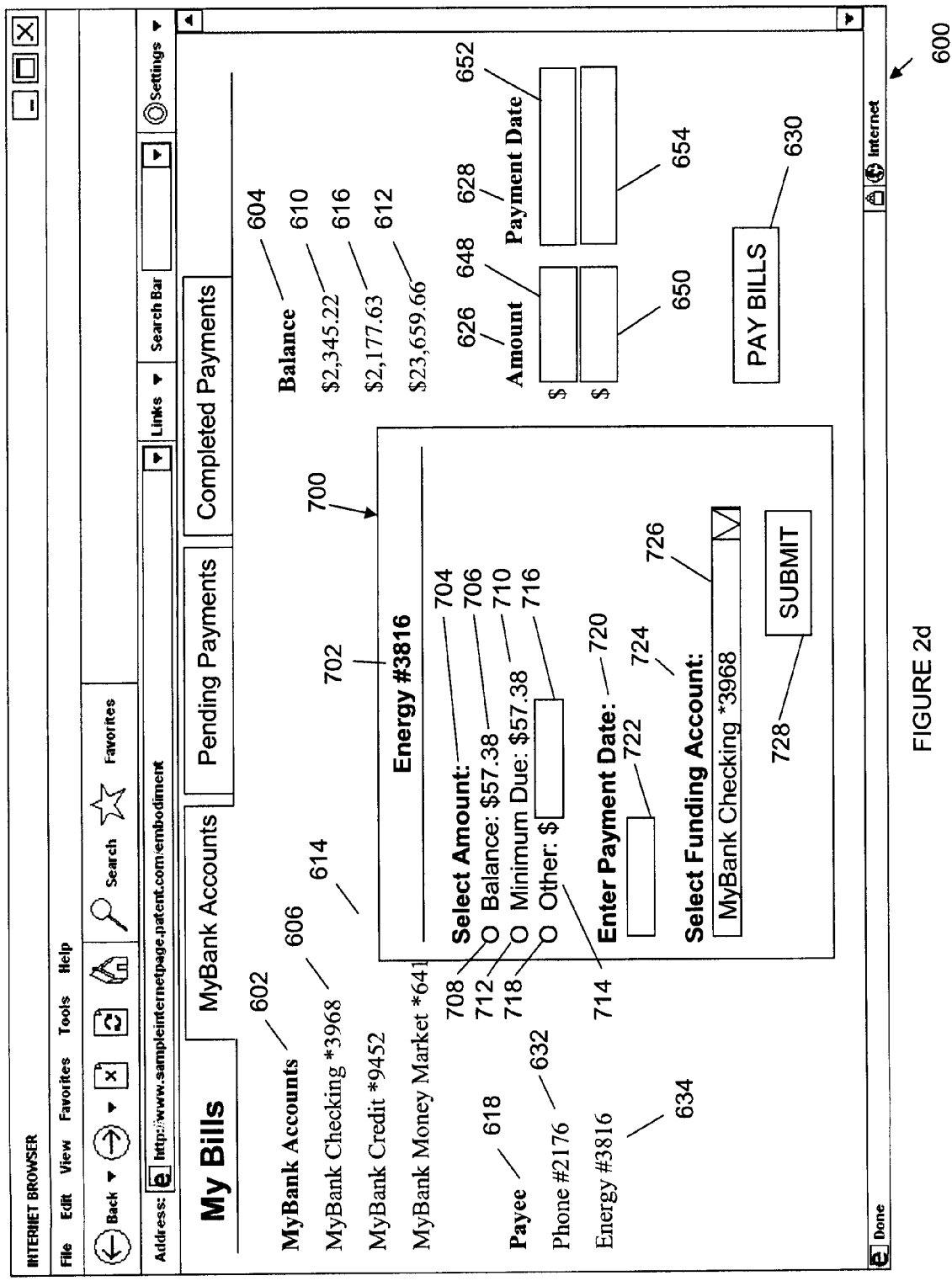

In an embodiment, after the provider 104 obtains the payee account information, the provider 104 may provide an Accounts And Bills webpage 600, illustrated in FIG. 2*c*, to the customer 106 over the network 102. The Accounts And Bills webpage 600 may be used to, for example, provide account information to the customer 106, provide payment information to the customer 106, and/or allow the customer 106 to provide payments to the payee. The Accounts And Bills webpage 600 includes account information headers such as a MyBank Accounts header 602 and a Balance header 604, along with corresponding banking account information about a plurality of banking accounts and corresponding credit card account information about a credit card account. The banking account information of the Accounts And Bills webpage 600 includes banking account names and account numbers 606 and 608 and corresponding banking account balances 610 and 612 for a MyBank Checking account and a MyBank Money Market account, respectively. The credit card account information includes a credit card account name and account number 614 and a corresponding credit card account balance 616 for a MyBank Credit account. The Accounts And Bills webpage 600 further includes payment information headers such as a Payee header 618, a Balance header 620, a Minimum Due header 622, a Due Date header 624, an Amount header 626 and a Payment Date header 628. Payment information about a plurality of payments is included under the headers 618, 620, 622, 624, 626 and 628, and a Pay Bills button 630 is included at the bottom of the Accounts And Bills webpage 600. The payment information of the Accounts And Bills webpage includes payee names and account numbers, corresponding payee account balances, corresponding minimum amounts due, and corresponding due dates, for payees Phone and Energy, respectively. For example, the payment information of the Accounts And Bills webpage 600 includes a Phone payee name and account 632 and an Energy payee name and account 634, a corresponding Phone balance 636 and a corresponding Energy balance 638, a corresponding Phone minimum due 640 and a corresponding Energy minimum due 642, and a corresponding Phone due date 644 and a corresponding Energy due date 646, respectively. The Accounts And Bills webpage 600 also includes amount fields 648 and 650 and payment date fields 652 and 654, which, in an embodiment, may be used by the customer 106 to provide payment amounts and dates of payments for the payees Phone and/or Energy. In an embodiment, for security reasons, only partial account numbers of the banking accounts, credit card accounts, and payee accounts may be displayed instead of full account numbers. In an embodiment, the displayed account names and numbers may be webpage links, and the customer 106 may access additional account information by selecting one of the webpage links.

Referring now to FIGS. 1a, 1b, 1c, 2a, 2b, 2c and 2d, the method 200 then proceeds to block 214 where the provider 104 provides the customer 106 an option on a webpage to select one of the banking account and the credit card account from which to provide a payment by, for example, electronically transferring funds to the payee. In an embodiment, the provider 106 may provide the customer 106 the option using an option window 700, illustrated in FIG. 2d. The option window 700 may be provided by the customer communication engine 130 when the customer 106 selects a bill to pay on the Accounts And Bills webpage 600. The option window 700 includes a payee name header 702, a Select Amount prompt 704, a Balance option 706, a corresponding balance button 708, a Minimum Due option 710, a corresponding minimum due button 712, an Other option 714, a corresponding other field 716, a corresponding other button 718, an Enter Payment Date prompt 720, a corresponding enter payment date field 722, a Select Funding Account prompt 724, a corresponding Select Funding Account field 726, and a Submit button 728. In an embodiment, the customer 106 may then a select a banking account or a credit card account from the Select Funding Account field 726 in order to indicate which account should be used to provide the payment. In an embodiment, the customer 106 may select a checking account, a credit account, a money market account, a banking account, an account provided by the provider 104, an account provided by the third party 108, combinations thereof, and/or a variety of other types of accounts from the Select Funding Account field 726. Additionally, the customer 106 may specify the payment amount by selecting one of the balance button 708 and the minimum due button 712, or by selecting the other button 718 and entering the payment amount in the other field 716.

The method 200 then proceeds to block 216 where the provider 104 receives a date of payment. In an embodiment, the provider 106 may receive the date of payment from the customer 106, the third party 108, and/or the payee. In the illustrated embodiment of FIG. 2d, the customer 106 may provide the date of payment by entering in a desired date of payment in the enter payment date field 722 and selecting the submit button 728. In an alternative embodiment, the customer 106 may enter the desired date of payment in the payment date field 654, the payment amount in the amount field 650, and select the Pay Bills button 630. In an embodiment, the date of payment may be a future date. In an embodiment, the date of payment may default to the current date if not specified by the customer 106.

The method 200 then proceeds to block 218 where the provider 104 provides a payment to the payee from the account selected at block 214. In an embodiment, the provider 104 may provide the payment from an account provided by the provider 104. In an embodiment, the provider 104 may provide the payment by initiating a transfer from an account provided by the third party 108. In an embodiment, the provider 104 may provide the payment on the date of payment that was received by the provider 104 at block 216. The method 200 then ends at block 220.

Referring now to FIGS. 1a, 1b, 1c and 3a, a method 300 to provide a payment is illustrated. One of skill in the art will recognize that, within the scope of this disclosure, additional steps may be provided before, during, and after the method 300, and some of the steps described below may be replaced or eliminated in some embodiments of the method 300.

The method 300 begins at block 302 where the provider 104 provides a payment assistance website to the customer 106 over the network 102. The payment assistance website may be a website that the customer 106 may use to access a payee website and/or provide a payment to a payee. In an embodiment, the customer 106 may provide access information for the payee website to the provider 104 so that the provider 104 may access the payee website on behalf of the customer 106. In an embodiment, the payment assistance website may then provide access to the payee website to the customer 106 by, for example, embedding a webpage of the payee website in a window of the Accounts And Bills webpage 600, described above with reference to FIG. 2c, and/or by providing a pop-up window that includes the webpage of the payee website. In an embodiment, the customer 106 may deep-dive to a requested webpage of the payee website. Deep-diving includes providing the requested webpage directly to the customer 106 without the customer 106 having to navigate the website in order to access the requested webpage.

Referring now to FIGS. 1a, 1b, 1c, 2b and 3a, the method 300 then proceeds to block 304 where the provider 104 receives access information for the payee website from the customer 106. In an embodiment, the customer 106 may use the Payee Account Setup webpage 500, described above with reference to FIG. 2b, to provide the access information for the payee website to the provider 104 over the network 102. In an embodiment, the customer may enter the name of the payee in the payee name field 506, the URL of a Login webpage of the payee website in the payee URL field 510, the account number of the account of the customer 106 in the customer account number field 514, the login identification of the customer 106 in the customer login ID field 518, the password of the customer 106 in the customer password field 522, and select the Submit button 524 to provide the access information for the payee website to the provider 104.

Referring now to FIGS. 1a, 1b, 1c, 2c and 3a, the method 300 then proceeds to block 306 where the provider 104 communicates with the customer 106 through the payment assistance website about a payment due to the payee. In an embodiment, the provider 104 may use the Accounts And Bills webpage 600, described above with reference to FIG. 2c, to communicate with the customer 106 about the payment due to the payee. In the illustrated embodiment, Phone and Energy are payees of the customer 106 and the provider 104 may use the Phone payee name and account 632, the corresponding Phone balance 636, the Phone minimum due 640, the Phone due date 644, the Energy payee name 634, the corresponding Energy balance 638, the Energy minimum due 642, and the Energy due date 646 to communicate with the customer 106 about the payments due to the payees Phone and Energy.

Referring now to FIGS. 1a, 1b, 1c, 3a and 3b, the method 300 then proceeds to block 308 where the provider 104 provides the payee website to the customer 106. In an embodiment, the website access engine 134 may use the access information for the payee website to securely login to and access the payee website on behalf of the customer 106 in order to provide the payee website to the customer 106. In an embodiment, the provider 104 may provide the payee website embedded in a provider website. In the illustrated embodiment, the provider 104 provides a Payment Assistance webpage 800 with a Payment webpage 900 of the payee website embedded in the Payment Assistance webpage 800. The Payment Assistance webpage 800 includes a Completed Payments And Payments Requiring Addition Information header 802, a You Have Completed The Following Payments header 804, a Payee header 806, a corresponding payee name 808, an Account header 810, a corresponding account name and account number 812, a Payment Amount header 814, a corresponding payment amount 816, a Pay Date header 818, a corresponding pay date 820, a Confirmation header 822, a corresponding confirmation string 824, a The Following Payments Require Additional Information header 826, a corresponding list of payments requiring additional information 828, and the embedded Payment webpage 900. The Payment webpage 900 includes a Welcome To Phone header 902, an Account Number header 904, a corresponding account number 906, a Step 1 of 2 Enter Payment Information header 908, a Payment Method prompt 910, a corresponding payment method field 912, a Scheduled Date prompt 914, a corresponding scheduled date field 916, an Amount prompt 918, a corresponding amount field 920, a Cancel button 922, and a Submit Payment button 924. In an alternative embodiment, the provider 104 may provide the payee website by using a pop-up window containing the payee website and/or by providing a URL to the payee website.

Figure 3A:
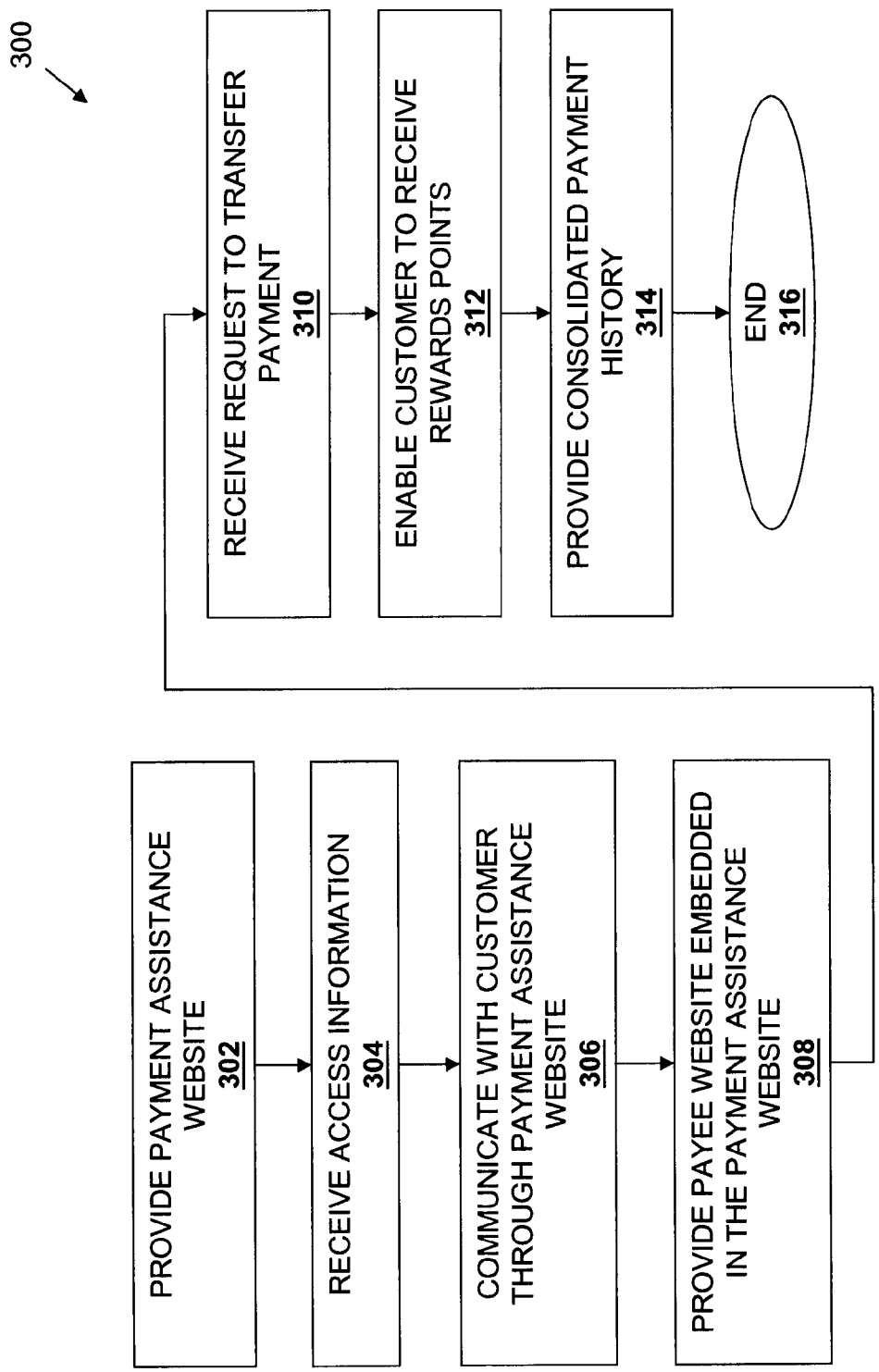
FIG. 3a is a flow chart illustrating an embodiment of a method to provide a payment.
Figure 3B:
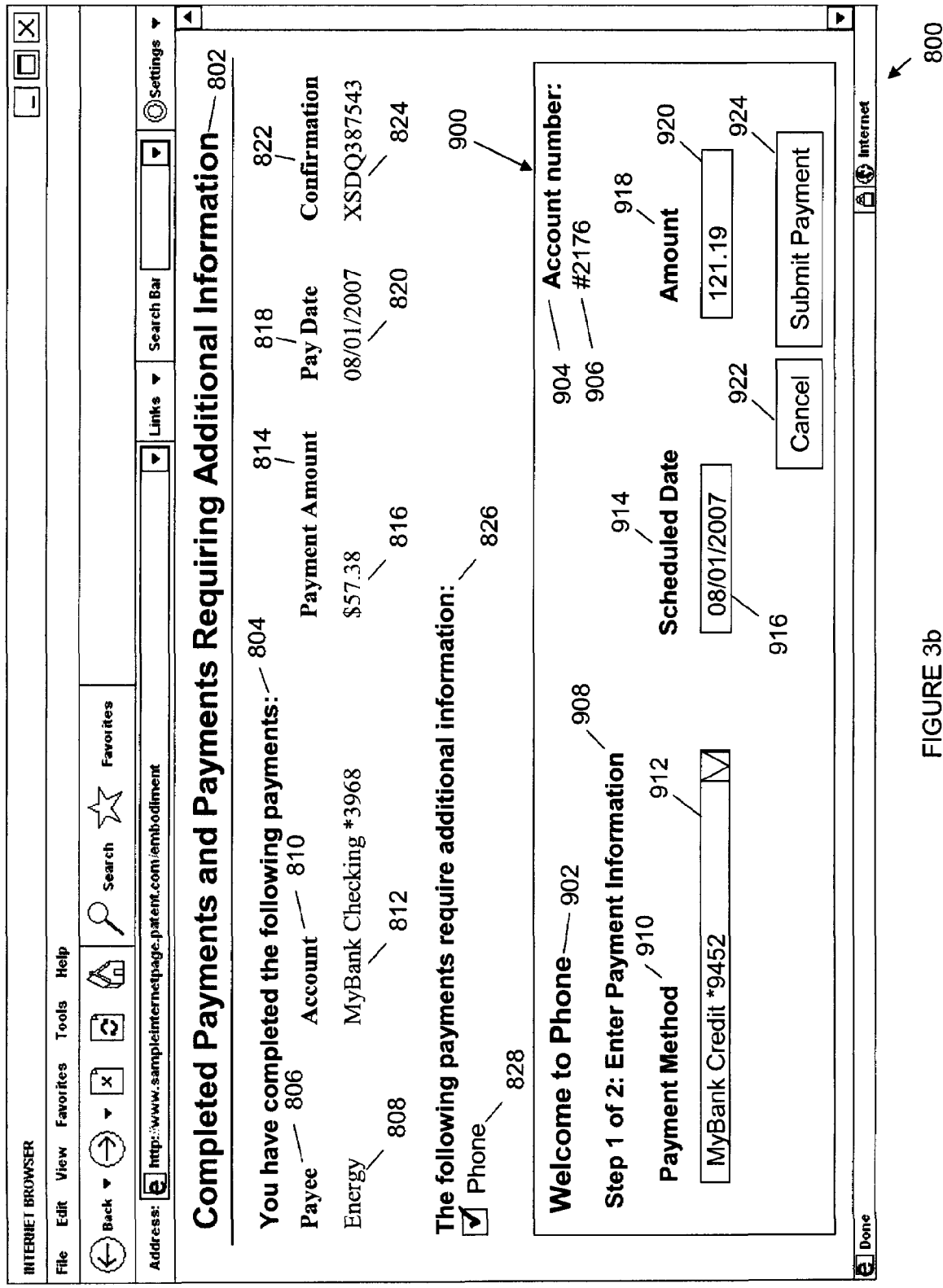
Figure 3C:
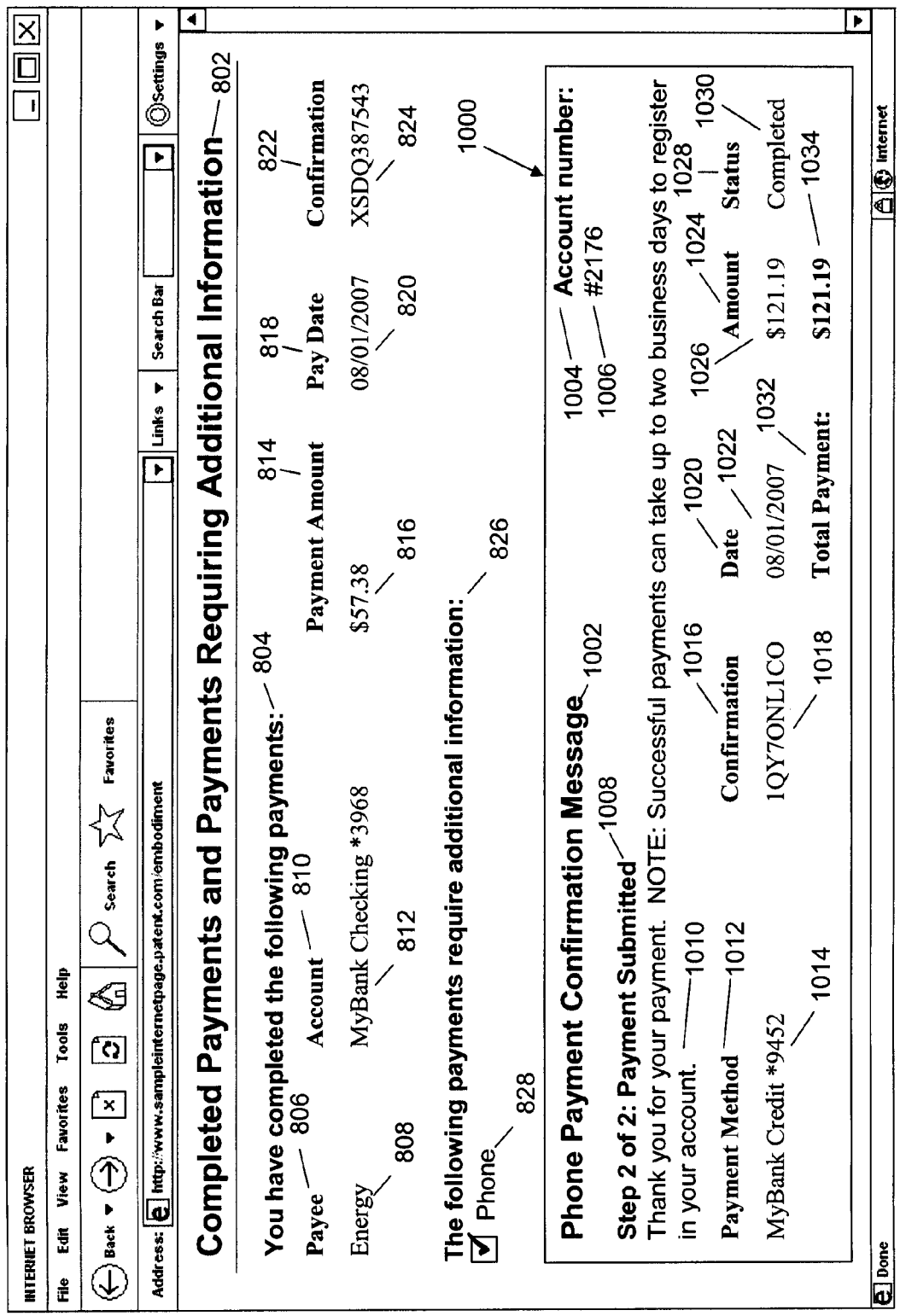
Figure 3D:
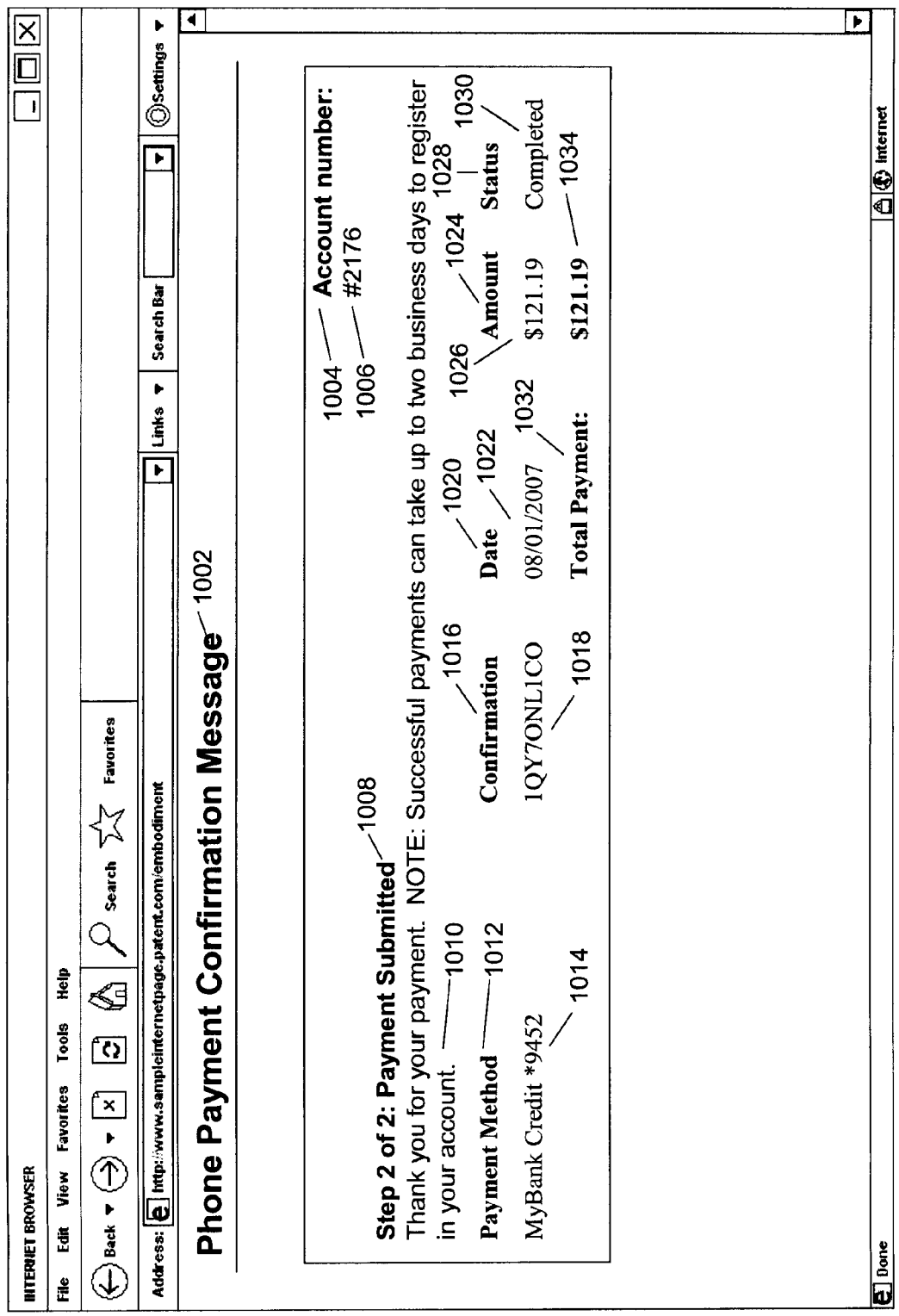
Figure 3E:
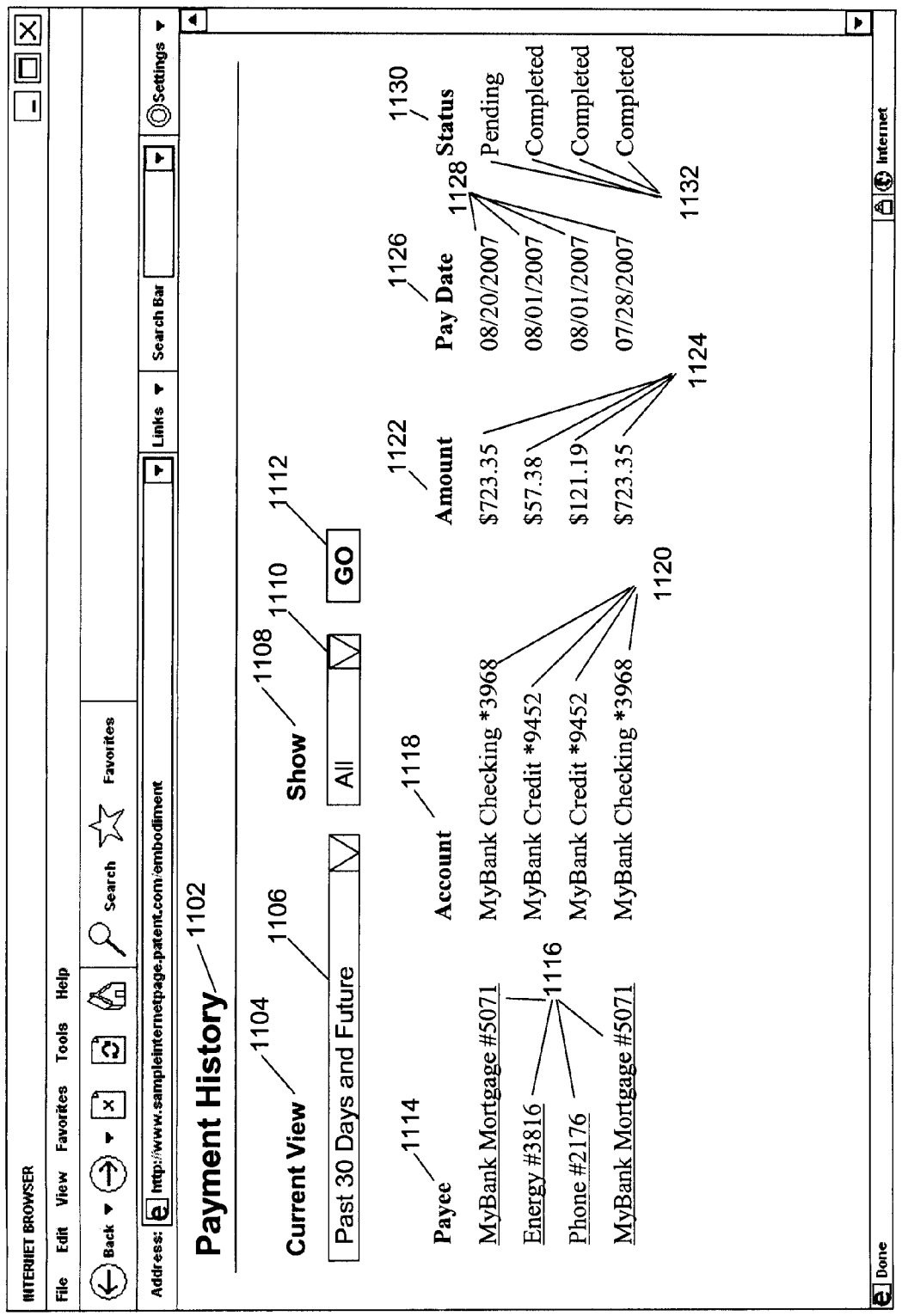

Referring now to FIGS. 1a, 1b, 1c, 3a, 3b, 3c and 3d, the method 300 then proceeds to block 310 where the provider 104 receives a request from the customer 106 to transfer a payment from an account of the customer 106 to the payee. In the illustrated embodiment, the customer 106 provides the request through the embedded Payment webpage 900 of the payee website by selecting an account (e.g., checking account, credit card account, savings account) in the payment method field 912, a date of payment in the scheduled date field 916, a payment amount in the amount field 920, and selecting the Submit Payment button 924. In an embodiment, the provider 104 may then provide the payment using the account selected in the payment method field 912, for the amount entered in the amount field 920, on the date entered in the scheduled date field 916. In an embodiment, the provider 104 may provide a Payment Confirmation webpage 1000 of the payee website embedded in the Payment Assistance webpage 800, as illustrated in FIG. 3c. The Payment Confirmation webpage 1000 of the payee website includes a Phone Payment Confirmation Message header 1002, an Account number header 1004, an account number 1006, a Step 2 of 2: Payment Submitted header 1008, payment information text 1010, a Payment Method header 1012, a corresponding payment method 1014, a Confirmation header 1016, a corresponding confirmation string 1018, a Date header 1020, a corresponding date 1022, an Amount header 1024, a corresponding amount 1026, a Status header 1028, a corresponding status 1030, a Total Payment header 1032, and a corresponding total payment amount 1034. The payment information text 1010 may include various information about the payment such as, for example, a statement of thanks and/or an amount of time the transfer of the payment may take. The confirmation string 1018 may include a string that is unique to the payment that the customer 106 may provide to the provider 104 if the customer 104 desires to communicate with the provider regarding the payment. The status 1030 may include status information about the payment such as, for example, whether the payment is pending, is scheduled, has been completed, and/or whether an error has occurred with the payment. In an alternative embodiment, the Payment Confirmation webpage 1000 may be standalone (e.g., not embedded in the Payment Assistance webpage 800), as illustrated in FIG. 3d.

In an embodiment, the provider 104 may obtain screenscraped information to provide in the Payment Confirmation webpage 1000 of the payee website. Screenscraped information may be the result of screenscraping, which is a technique in which a computer program (e.g., instructions on a computer readable medium of the provider 104) extracts data from a display output of another program (e.g., a webpage of the payee website). Screenscraping a webpage may include a variety of techniques known in the art such as, for example, parsing text, capturing text, capturing images, capturing a screenshot, and/or downloading the webpage. In an embodiment, the provider 104 may obtain a variety of screenscraped information from the Payment Confirmation webpage 1000 such as, for example, the account number 1006, the payment method 1014, the confirmation string 1018, the amount 1026, the total payment amount 1034, the date 1022, and the status 1030. In an embodiment, the provider 104 may use the payment engine 136 to store the screenscraped information in the payment database 140.

The method 300 then proceeds to block 312 where, in response to the customer 106 providing a payment from the credit card account, the provider 104 enables the customer 106 to receive rewards points. Rewards points may include points awarded to the customer 106 that may be redeemed, for example, for airline tickets, gift certificates, cash, gifts, and/or a variety of other kinds of rewards known in the art. In an embodiment, the customer 106 may receive rewards points when the customer 106 uses the credit card to purchase an item, purchase a service, and/or pay a bill, as described above.

Referring now to FIGS. 1a, 1b, 1c, 3a, 3d and 3e, the method 300 then proceeds to block 314 where the provider 104 provides the consolidated payment history to the customer 106. In an embodiment, the consolidated payment history may include a consolidated listing of payment information about past and/or scheduled payments from the customer 106 to the payee. In an embodiment, the provider 104 may store the consolidated payment history in the payment database 140 and provide access to the consolidated payment history to the customer 106 over the network 102. The payment information may include the screenscraped information from block 310.

In an embodiment, the provider 104 may provide the consolidated payment history to the customer 106 using a Payment History webpage 1100. In an embodiment, the Payment History webpage 1100 includes a Payment History header 1102, a Current View prompt 1104, a corresponding current view field 1106, a Show prompt 1108, a corresponding show field 1110, a Go button 1112, a Payee header 1114, an Account header 1118, an Amount header 1122, a Pay Date header 1126, a Status header 1130, a plurality of payee name and account number links 1116, a plurality of corresponding accounts 1120, a plurality of corresponding payment amounts 1124, a plurality of corresponding dates of payments 1128, and a plurality of corresponding statuses 1132. In the illustrated embodiment, one of the plurality of payee name and account number links 1116 includes the information described above with reference to FIGS. 3b, 3c, and 3d.

In an embodiment, the customer 106 may select the payment name and account number link 1116 that includes the Phone payee name and account number. In an embodiment, the provider 104 may then use the screenscraped information that was obtained in block 310 to provide the Payment Confirmation webpage 1000 of FIG. 3d to the customer 106 over the network 102. The method 300 then ends at block 316.

Referring now to FIGS. 1a, 1b, 1c, 4a and 4b, a method 400 to access a website is illustrated. One of skill in the art will recognize that, within the scope of this disclosure, additional steps may be provided before, during, and after the method 400, and some of the steps described below may be replaced or eliminated in some embodiments of the method 400.

The method 400 begins at block 402 where the provider 104 receives first website access information from the customer 106. The first website access information may include access information, such as described above, for a first website. In an embodiment, the provider 104 may provide a Login webpage 1200 to the customer 106 in order to receive the first website access information over the network 102 such that the customer 106 may login to the first website. The Login webpage 1200 includes a Login webpage header 1202, a login ID prompt 1204, a corresponding login ID field 1206, a Password prompt 1208, a corresponding password field 1210, and a Submit button 1212. In an embodiment, the customer 106 may enter a login ID for the first website into the login ID field 1206, a password for the first website into the password field 1210, and select the Submit button 1212 to provide the first website access information to the provider 104.

Referring now to FIGS. 1a, 1b, 1c, 4a and 4c, the method 400 then proceeds to block 404 where the provider 104 provides the first website to the customer 106. In an embodiment, the first website may be a website of the provider 104, a website of the third party 108, a payee website, and/or a variety of other websites known in the art. In an embodiment, the first website may include the Accounts And Bills webpage 600, described above with reference to FIG. 2c, and/or the Payment Assistance webpage 800, described above with reference to FIGS. 3b and 3c. In the illustrated embodiment of FIG. 4c, the first website includes a Hub webpage 1300. The Hub webpage 1300 includes a One-Click Access header 1302, an msn button 1304, an at&t button 1306, a Yahoo button 1308, and an Add New Website button 1310.

Referring now to FIGS. 1a, 1b, 1c, 4a, 4c and 4d, the method 400 then proceeds to block 406 where the provider 104 receives second website access information from the customer 106 over the network 102. In an embodiment, in response to the customer 106 selecting the Add New Website button 1310, the provider 104 may provide a Website Setup webpage 1400. The Website Setup webpage 1400 includes a One-Click Setup header 1402, a URL prompt 1404, a corresponding URL field 1406, a Login ID prompt 1408, a corresponding login ID field 1410, a Password prompt 1412, a corresponding password field 1414, and a Submit button 1416. In an embodiment, if the customer 106 desires to add a MyBank webpage as the second website, the customer 106 may enter a MyBank URL (e.g., www.mybank.com) in the URL field 1406, a login ID for MyBank in the Login ID field 1410, a password for MyBank in the password field 1414 and select the Submit button 1416 to provide the second website access information to the provider 104. In an embodiment, the second website may be a website of the provider 104, a website of the third party 108, a payee website, and/or a variety of other websites known in the art. In an embodiment, the msn button 1304, the at&t button 1306, and the Yahoo button 1308, described above with reference to FIG. 4c, may be created in substantially the same manner as described above.

Figure 4A:
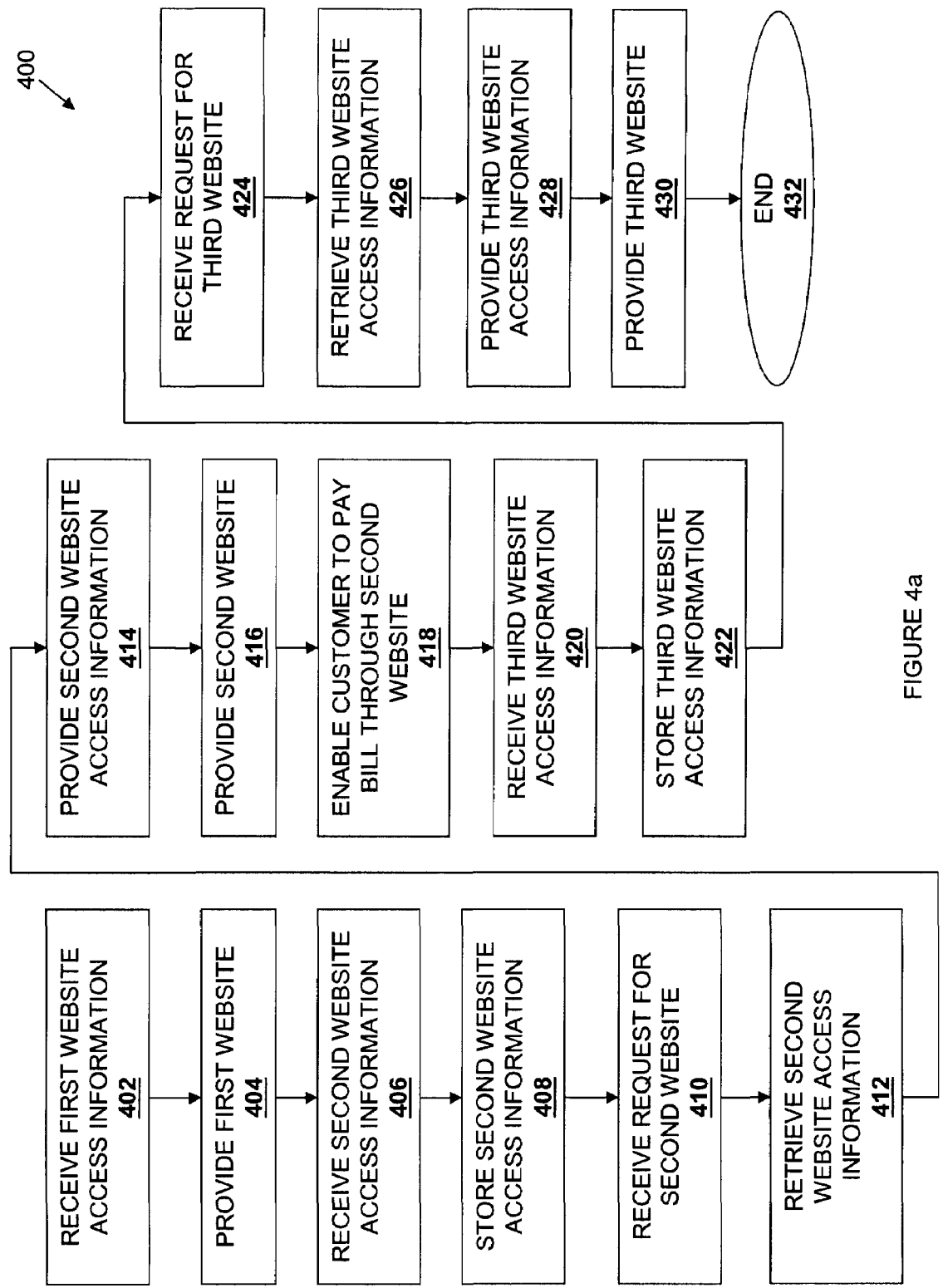
FIG. 4a is a flow chart illustrating an embodiment of a method to provide a payment.
Figure 4B:
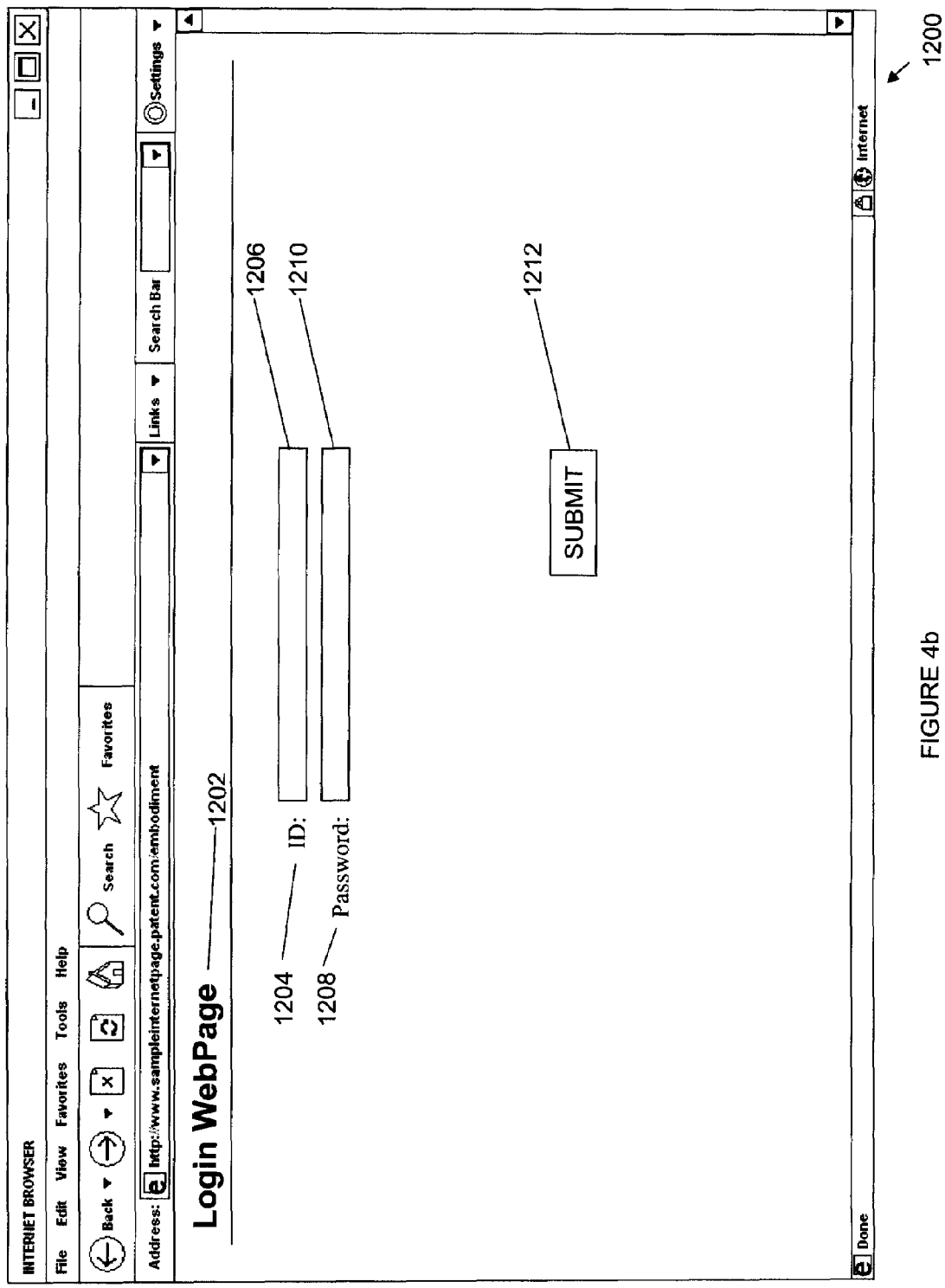
Figure 4C:
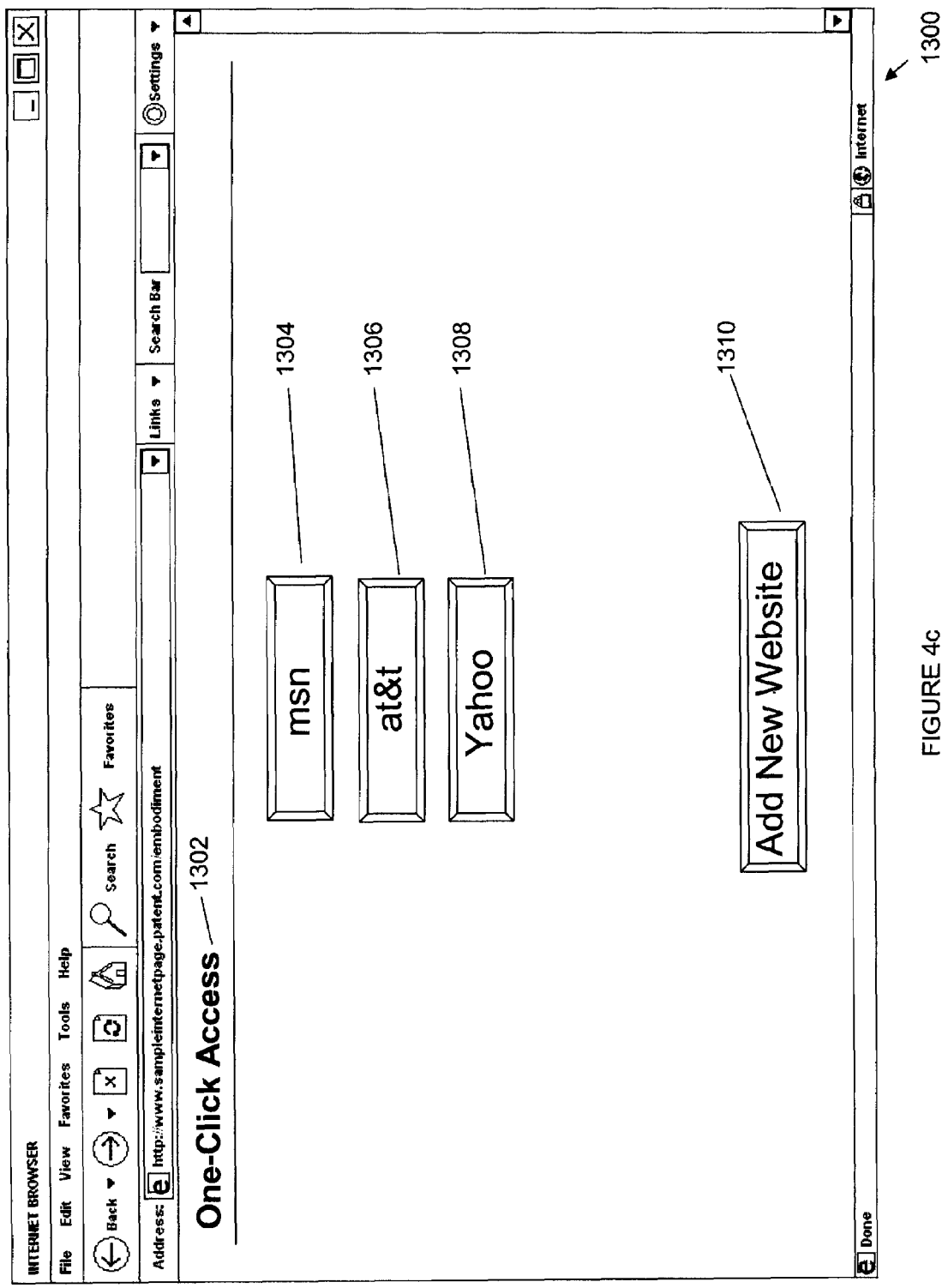
Figure 4D:
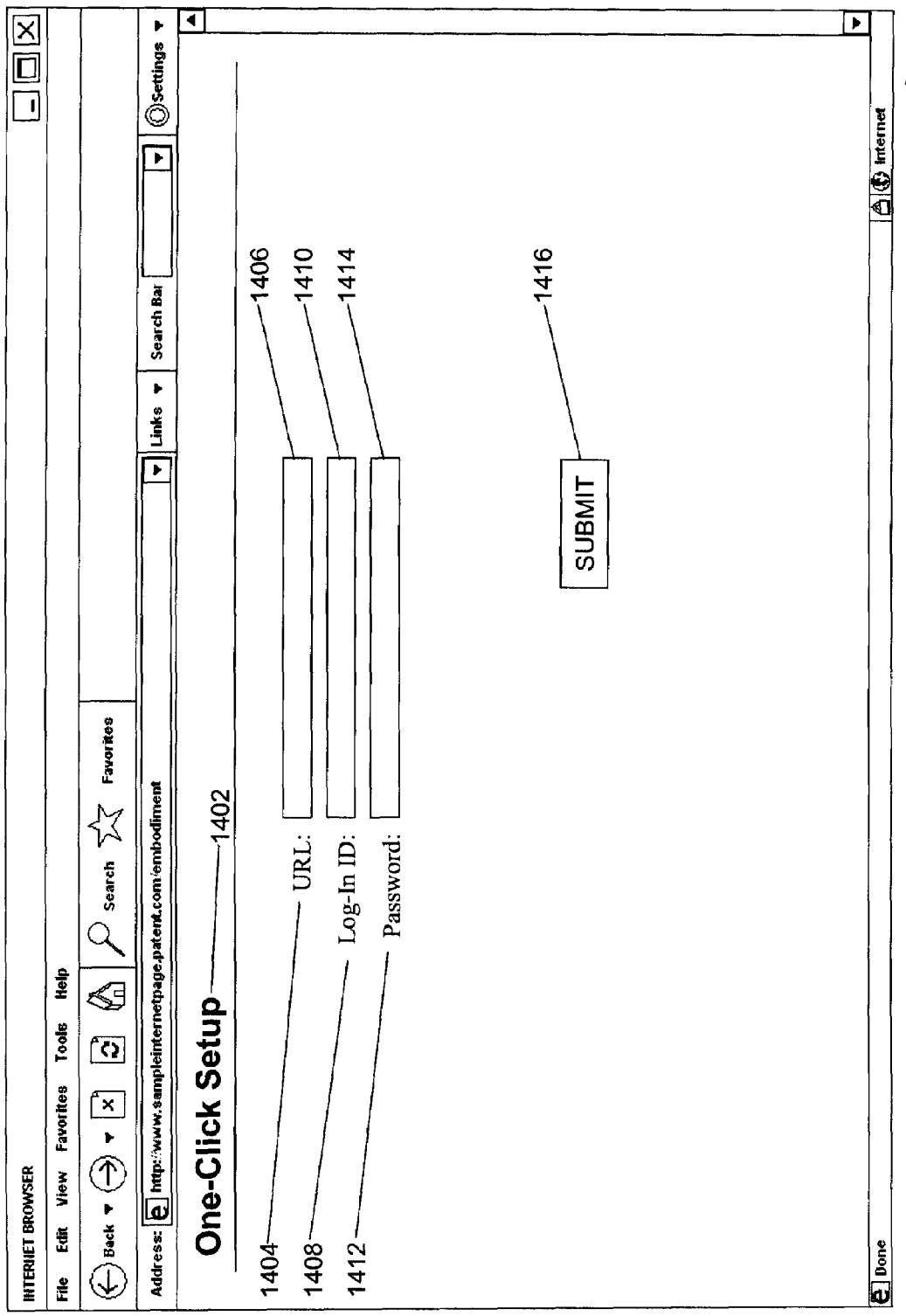
Figure 4E:
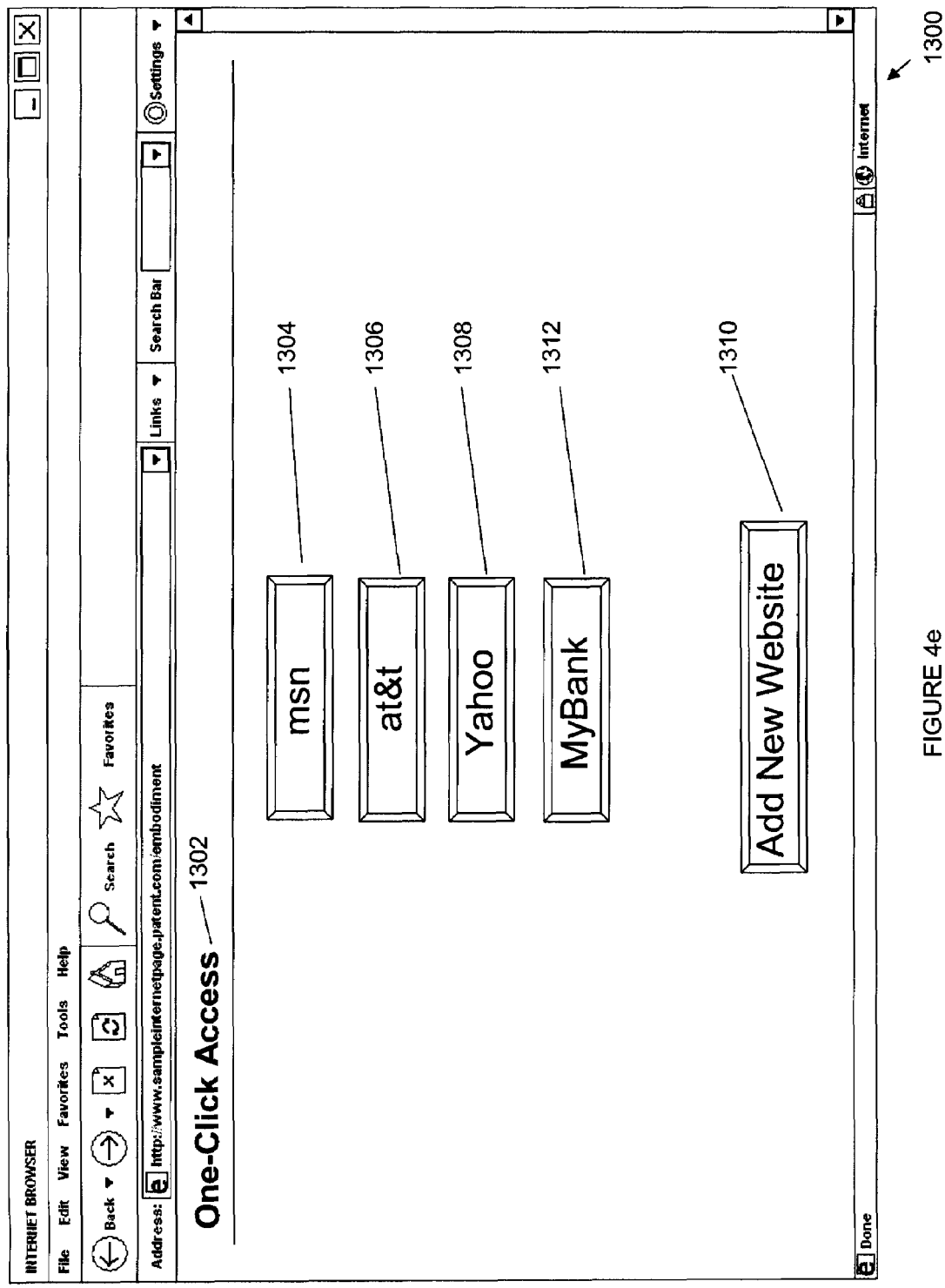

Referring now to FIGS. 1a, 1b, 1c, 4a and 4e, the method 400 then proceeds to block 408 where the provider 104 stores the second website access information in a remote database. The remote database is a database that is stored remotely with respect to the IHS 112 of the customer 106. For example, the remote database may be stored on the website access database 138. In an embodiment, the provider 104 may then provide an updated version of the Hub webpage 1300 to the customer, as illustrated in FIG. 4e. The updated Hub webpage 1300 of FIG. 4e includes the One-Click Access header 1302, the msn button 1304, the at&t button 1306, the Yahoo button 1308, a MyBank button 1312, and the Add New Website button 1310.

The method 400 then proceeds to block 410 where the provider 104 receives a request from the customer 106 to access the second website over the network 102. For example, the customer 106 may select the MyBank button 1312 to provide a request to the provider 104 to access the second website (e.g., MyBank). The method 400 then proceeds to block 412 where the provider 104 retrieves the second website access information from the remote database. For example, if the customer 106 selected the MyBank button 1312 in block 410, the provider 104 may retrieve the MyBank URL, the login ID for MyBank, and the password for MyBank from the remote database.

The method 400 then proceeds to block 414 where the provider 104 provides the second website access information to the second website. In an embodiment, the website access engine 134 may use the second website access information to securely login to and access the second website on behalf of the customer 106 in order to allow the customer 106 to access the second website. For example, if the customer 106 selected the MyBank button 1312 in block 410, the provider 104 may access the MyBank URL, and submit the login ID and password for MyBank to the MyBank website.

The method 400 then proceeds to block 416 where the provider 104 provides the second website. In an embodiment, the provider 104 provides the second website to the customer 106 over the network 102. In an embodiment, the provider 104 may provide the second website in a pop-up window and/or embedded in a first website provided by the provider 104. Thus, the second website is provided to the customer 106 by the customer selecting the MyBank button 1312, which may be referred to as 'one-click access' to the second website.

Referring now to FIGS. 1a, 1b, 1c, 2c and 4a, the method 400 then proceeds to block 418 where the provider 104 enables the customer to pay a bill through the second website. In an embodiment, the customer 106 may pay a bill through a payment webpage that is part of the MyBank website, similar to the Accounts And Bills webpage 600, described above with reference to FIG. 2c.

Referring now to FIGS. 1a, 1b, 1c, 4a and 4b, the method 400 then proceeds to block 420 where the provider 104 receives third website access information from the customer 106 over the network 102. The third website access information may include access information for a third website. In an embodiment, the third website may be a website of the provider 104, a website of the third party 108, a payee website, and/or a variety of other websites known in the art. In an embodiment, if the customer 106 desires to add an Amazon website as the third website, the customer 106 may enter an Amazon URL (e.g., www.amazon.com) in the URL field 1406, a login ID in the Login ID field 1410, a password in the password field 1414 and select the Submit button 1416 to provide the third website access information to the provider 104.

Figure 4F:
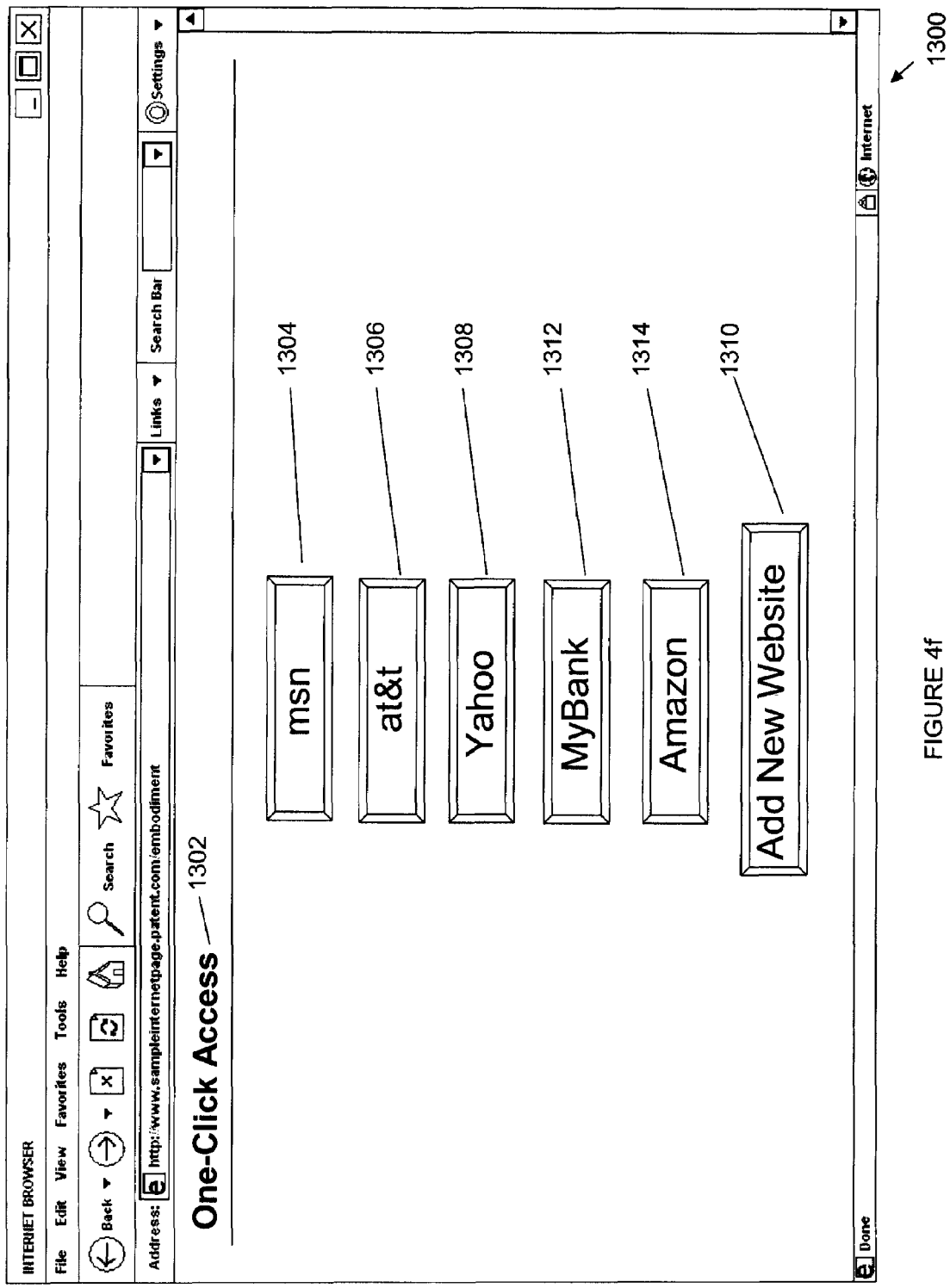

Referring now to FIGS. 1a, 1b, 1c, 4a and 4f, the method 400 then proceeds to block 422 where the provider 104 stores the third website access information in the remote database, described above. In an embodiment, the provider 104 may then provide an updated Hub webpage 1300 to the customer, as illustrated in FIG. 4f. The updated Hub webpage 1300 of FIG. 4f includes the One-Click Access header 1302, the msn button 1304, the at&t button 1306, the Yahoo button 1308, the MyBank button 1312, an Amazon button 1314, and the Add New Website button 1310.

The method 400 then proceeds to block 424 where the provider 104 receives a request from the customer 106 to access the third website over the network 102. For example, the customer 106 may select the Amazon button 1314 to provide a request to access the third website (e.g., Amazon). The method 400 then proceeds to block 426 where the provider 104 retrieves the third website access information from the remote database. For example, if the customer 106 selected the Amazon button 1314 in block 424, the provider 104 may retrieve the Amazon URL, the login ID for Amazon, and the password for Amazon from the remote database.

The method 400 then proceeds to block 428 where the provider 104 provides the third website access information to the third website in order to allow the customer 106 to access the third website. For example, if the customer 106 selected the Amazon button 1314 in block 424, the provider 104 may access the Amazon URL, and submit the login ID and password for Amazon to the Amazon website.

The method 400 then proceeds to block 430 where the provider 104 provides the third website. In an embodiment, the provider 104 provides the third website to the customer 106 over the network 102. In an embodiment, the provider 104 may provide the third website in a pop-up window and/or embedded in the first website. The method then ends at block 432.

Thus, systems and methods have been described that demonstrate a variety of techniques to provide a payment. Instead of a provider requiring a customer to visit several websites in order to provide payments from a variety of accounts to a variety of payees, the customer may be allowed to visit a single website of the provider in order to provide the payments. This may result in improved efficiency in the payment transactions, and higher customer satisfaction with the provider.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system to provide website access, the system comprising at least one subsystem to:
   provide a customer access website for a customer to use in making a payment, the customer access website having connections to multiple accounts associated with the customer from multiple payees and wherein each payee has a payee website on which one or more of the multiple accounts can be accessed by the customer;
   receive payee website access information from the customer for at least one payee website, the website access information corresponding to a payee website;
   store the payee website access information in a database;
   receive a request to access one of the payee websites from the customer via the customer website to access the second website;
   retrieve the payee website access information from the database;
   provide the payee website access information to the payee website in order to allow the customer to access at least a portion of the payee website embedded in the customer website; and
   send payment information to the payee website, wherein the payment information is sufficient for a customer to make a payment on the at least a portion of the payee website embedded in the customer website.

2. The system of claim 1, further comprising at least one subsystem to:
   use a universal resource locater to deep-dive directly to a requested webpage of the second website.

3. The system of claim 1, further comprising at least one subsystem to:
   provide the payee website in a pop-up window.

4. The system of claim 1, wherein the payee website access information comprises information selected from the group consisting of a personal identification number (PIN), a password, an account number, a universal resource locator (URL) address, a login identification, and combinations thereof.

5. The system of claim 1, further comprising at least one subsystem to:
   receive customer access website access information from the customer, the customer access website access information corresponding to the customer access website.

6. The system of claim 1, further comprising at least one subsystem to:
   receive third website access information from the customer, the third website access information corresponding to a third website;
   store the third website access information in the remote database;
   receive a request from the customer to access the third website;
   retrieve the third website access information from the remote database; and
   provide the third website access information to the third website in order to allow the customer to access the third website.

7. The system of claim 1, further comprising:
   enabling the customer to pay a bill through the payee website subsequent to logging the customer into the payee website by initiating a transfer from at least one of a plurality of monetary accounts from which the customer has selected to pay the payee.

8. A computer-readable medium comprising computer-readable instructions to provide website access, said computer-readable instructions comprising instructions to:
   provide a customer access website for a customer to use in making a payment, the customer access website having connections to multiple accounts associated with the customer from multiple payees and wherein each payee has a payee website on which one or more of the multiple accounts can be accessed by a customer;
   receive payee website access information from the customer for at least one payee website, the payee website access information corresponding to a payee website;
   store the payee website access information in a database;
   receive a request to access one of the payee websites from the customer via the customer website;
   retrieve the payee website access information from the database;
   provide the payee website access information to the payee website in order to allow the customer to access at least a portion of the payee website embedded in the customer website; and
   send payment information to the payee website, wherein the payment information is sufficient for a customer to make a payment on the at least a portion of the payee website embedded in the customer website.

9. The computer-readable medium of claim 8, further comprising computer-readable instructions comprising instructions to:

deep-dive to a requested webpage of the second website.

10. The computer-readable medium of claim 8, further comprising computer-readable instructions comprising instructions to:

provide the payee website in a pop-up window.

11. The computer-readable medium of claim 8, wherein the payee website access information comprises information selected from the group consisting of a personal identification number (PIN), a password, an account number, a universal resource locator (URL) address, a login identification, and combinations thereof.

12. The computer-readable medium of claim 8, further comprising computer-readable instructions comprising instructions to:

receive customer access website access information from the customer, the customer access website access information corresponding to the customer access website.

13. The computer-readable medium of claim 8, further comprising computer-readable instructions comprising instructions to:

receive third website access information from the customer, the third website access information corresponding to a third website;

store the third website access information in the database;

receive a request from the customer to access the third website;

retrieve the third website access information from the database; and provide the third website access information to the third website in order to allow the customer to access the third website.

14. The computer-readable medium of claim 8, further comprising computer-readable instructions comprising instructions to:

enable the customer to pay a bill through the payee website subsequent to logging the customer into the payee website initiating a transfer from at least one of the plurality of monetary accounts from which the customer has selected to pay the payee.

15. A method to provide website access, the method comprising:

providing a customer access website for a customer to use in making a payment, the customer access website having connections to multiple accounts associated with the customer from multiple payees and wherein each payee has a payee website on which one or more of the multiple accounts can be accessed by a customer;

receiving payee website access information from the customer for at least one payee website, the payee website access information corresponding to a payee website;

storing the payee website access information in a database;

receiving a request to access one of the payee websites from the customer via the customer website;

retrieving the payee website access information from the database;

providing the payee website access information to the payee website in order to allow the customer to access at least a portion of the payee website embedded in the customer website; and sending payment information to the payee website, wherein the payment information is sufficient for a customer to make a payment on the at least a portion of the payee website embedded in the customer website.

16. The method of claim 15, further comprising:

deep-diving to a requested webpage of the second website.

17. The method of claim 15, further comprising:

providing the payee website in a pop-up window.

18. The method of claim 15, wherein the payee website access information comprises information selected from the group consisting of a personal identification number (PIN), a password, an account number, a universal resource locator (URL) address, a login identification, and combinations thereof.

19. The method of claim 15, further comprising:

receiving customer access website access information from the customer, the customer access website access information corresponding to the customer access website.

20. The method of claim 15, further comprising:

receiving third website access information from the customer, the third website access information corresponding to a third website;

storing the third website access information in the remote database;

receiving a request from the customer to access the third website;

retrieving the third website access information from the remote database; and providing the third website access information to the third website in order to allow the customer to access the third website.

21. The method of claim 15, further comprising:

enabling the customer to pay a bill through the payee website subsequent to logging the customer into the payee website initiating a transfer from at least one of the plurality of monetary accounts from which the customer has selected to pay the payee.

* * * * *